US010681550B2

United States Patent
Li et al.

(10) Patent No.: US 10,681,550 B2
(45) Date of Patent: *Jun. 9, 2020

(54) WIRELESS LOCAL AREA NETWORK ACCESS METHOD, BASE STATION CONTROLLER, AND USER EQUIPMENT

(71) Applicant: Huawei Technologies Co., Ltd., Shenzhen, Guangdong (CN)

(72) Inventors: Bingzhao Li, Beijing (CN); Xiaoxiao Zheng, Shanghai (CN); Yanyan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,446

(22) Filed: Oct. 19, 2018

(65) Prior Publication Data

US 2019/0053058 A1 Feb. 14, 2019

Related U.S. Application Data

(63) Continuation of application No. 14/670,263, filed on Mar. 26, 2015, now Pat. No. 10,123,207, which is a
(Continued)

(51) Int. Cl.
*G06F 21/00* (2013.01)
*H04W 12/08* (2009.01)
(Continued)

(52) U.S. Cl.
CPC ........... *H04W 12/08* (2013.01); *H04W 48/14* (2013.01); *H04W 48/20* (2013.01); *H04W 84/12* (2013.01)

(58) Field of Classification Search
None
See application file for complete search history.

(56) References Cited

U.S. PATENT DOCUMENTS

| 7,453,858 B2 | 11/2008 | Csapo et al. |
| 7,499,460 B2 | 3/2009 | Csapo |

(Continued)

FOREIGN PATENT DOCUMENTS

| CN | 1925683 A | 3/2007 |
| CN | 101001456 A | 7/2007 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2( Release 11)"; 3GPP TS 36.300 V11.3.0; Sep. 2012; 205 pages.

(Continued)

*Primary Examiner* — Maung T Lwin
(74) *Attorney, Agent, or Firm* — Leydig, Voit & Mayer, Ltd.

(57) ABSTRACT

The present application provides a method, a base station controller, and a user equipment. The method includes: determining, by a base station controller of a user equipment, a first access point set, and sending information about the first access point set to the user equipment; and determining, by the user equipment according to the first access point set, an access point for accessing a wireless local area network. In embodiments of the present application, when a user equipment needs to access a wireless local area network through an access point to access the Internet, a base station controller may notify the user equipment of an available access point. In this way, the user equipment can access the wireless local area network directly through the available access point and does not need to request a password from an operator and enter the password during access.

20 Claims, 4 Drawing Sheets

Related U.S. Application Data continuation of application No. PCT/CN2012/082358, filed on Sep. 28, 2012.

(51) Int. Cl.
*H04W 48/14* (2009.01)
*H04W 84/12* (2009.01)
*H04W 48/20* (2009.01)

(56) References Cited

U.S. PATENT DOCUMENTS

| | | | |
|---|---|---|---|
| 7,545,787 B2* | 6/2009 | Bitran | H04W 88/06 370/277 |
| 7,714,698 B2* | 5/2010 | Kaplan | G06K 7/10306 340/10.1 |
| 8,014,804 B2 | 9/2011 | Banerjea | |
| 8,380,203 B1* | 2/2013 | Semersky | H04W 36/023 455/437 |
| 2003/0202497 A1 | 10/2003 | Csapo | |
| 2004/0039817 A1 | 2/2004 | Lee et al. | |
| 2004/0076120 A1 | 4/2004 | Ishidoshiro | |
| 2005/0030922 A1 | 2/2005 | Lee et al. | |
| 2005/0147068 A1 | 7/2005 | Rajkotia | |
| 2006/0045069 A1* | 3/2006 | Zehavi | H04L 12/5692 370/352 |
| 2006/0135066 A1* | 6/2006 | Banerjea | H04W 48/20 455/41.2 |
| 2006/0143458 A1 | 6/2006 | Tie et al. | |
| 2007/0123195 A1 | 5/2007 | Lv et al. | |
| 2007/0197237 A1 | 8/2007 | Powell et al. | |
| 2008/0014916 A1 | 1/2008 | Chen | |
| 2008/0014934 A1* | 1/2008 | Balasubramanian | H04W 48/16 455/434 |
| 2008/0026748 A1 | 1/2008 | Alexander et al. | |
| 2008/0058003 A1 | 3/2008 | Rydnell et al. | |
| 2008/0186882 A1 | 8/2008 | Scherzer et al. | |
| 2008/0224869 A1 | 9/2008 | Kaplan | |
| 2009/0042561 A1* | 2/2009 | Jackson | H04W 24/08 455/426.1 |
| 2009/0245133 A1* | 10/2009 | Gupta | H04W 48/14 370/254 |
| 2009/0252095 A1* | 10/2009 | Lu | H04W 16/14 370/329 |
| 2009/0325566 A1* | 12/2009 | Bell | H04W 4/029 455/419 |
| 2010/0082999 A1 | 4/2010 | Ando et al. | |
| 2010/0232365 A1 | 9/2010 | Lu et al. | |
| 2010/0238871 A1 | 9/2010 | Tosic et al. | |
| 2010/0303051 A1 | 12/2010 | Umeuchi et al. | |
| 2011/0103359 A1 | 5/2011 | Cho et al. | |
| 2011/0222523 A1* | 9/2011 | Fu | H04W 36/22 370/338 |
| 2011/0286437 A1* | 11/2011 | Austin | H04W 88/06 370/338 |
| 2013/0163463 A1* | 6/2013 | Grayson | H04L 43/0876 370/253 |

FOREIGN PATENT DOCUMENTS

| | | |
|---|---|---|
| CN | 101715184 A | 5/2010 |
| CN | 102421166 A | 4/2012 |
| CN | 102647771 A | 8/2012 |
| EP | 1411701 A2 | 4/2004 |
| EP | 2770754 A1 | 8/2014 |
| EP | 2824870 A1 | 1/2015 |
| WO | 2004105420 A1 | 12/2004 |

OTHER PUBLICATIONS

"3rd Generation Partnership Project;Technical Specification Group Radio Access Network; Evolved Universai Terrestrial Radio Access (E-UTRA); User Equipment (UE) procedures in idle mode(Release 11)"; 3GPP TS 36.304 V11.1.0; Sep. 2012; 33 pages.

"3rd Generation Partnership Project; Technical Specification Group Radio Access Network; Evolved Universal Terrestrial Radio Access (E-UTRA); Radio Resource Control (RRC); Protocol specification(Release 11)"; 3GPP TS 36.331 V11.1.0; Sep. 2012; 325 pages.

* cited by examiner

WIRELESS LOCAL AREA NETWORK ACCESS METHOD, BASE STATION CONTROLLER, AND USER EQUIPMENT

CROSS-REFERENCE TO RELATED APPLICATIONS

This application is a continuation of U.S. patent application Ser. No. 14/670,263, filed Mar. 26, 2015, which is a continuation of International Application No. PCT/CN2012/082358, filed on Sep. 28, 2012, All of the afore-mentioned patent applications are hereby incorporated by reference in their entireties.

TECHNICAL FIELD

Embodiments of the present application relate to the field of communications technologies, and in particular, to a method for accessing a wireless local area network, a base station controller, and a user equipment.

BACKGROUND

With the popularity of a wireless local area network (WEAN), an operator may construct the WLAN in some places (for example, a shopping mall and an office building) while operating a mobile network. When a user equipment (UE) is within the coverage of the WLAN, it is capable of accessing the Internet through a WLAN access point (Access Point, AP) to perform operations such as web browsing and download. When the user equipment needs to access the Internet through the WLAN, the user equipment needs to request a password of the WLAN AP from the operator by using a short message or in another manner, and needs to enter the password when accessing the AP.

SUMMARY

The present application provides a method for accessing a wireless local area network, a base station controller, and a user equipment, so that when needing to access the Internet through an AP, the user equipment does not need to request a password from an operator and enter the password during access.

In a first aspect, the present application provides a method for accessing a wireless local area network WLAN, the method is performed by a base station controller of a serving base station of a user equipment and includes: determining a first access point AP set in the case of receiving an access capability indication or access request sent by the user equipment, where the first AP set includes at least one AP; and sending information about the first AP set to the user equipment according to the first AP set, so that the user equipment determines, according to the information about the first AP set, an access AP for accessing a WLAN.

With reference to the first aspect, in a first possible implementation manner, the information about the first AP set includes at least one of the following: a channel number of at least one AP in the first AP set, identification information of at least one AP in the first AP set, information about a beacon channel of at least one AP in the first AP set, and a security parameter of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

With reference to the first aspect or the first possible implementation manner of the first aspect, in a second possible implementation manner, after the sending information about the first AP set to the user equipment, the method further includes:
receiving information about a second AP set sent by the user equipment, where the second AP set includes at least one AP, and the second AP set is determined by the user equipment from the at least one AP in the first AP set;
determining a third AP set from the at least one AP in the second AP set, where the third AP set includes at least one AP; and
sending information about the third AP set to the user equipment according to the third AP set, so that the user equipment determines, from the at least one AP in the third AP set, the access AP for accessing the WLAN.

With reference to the second possible implementation manner of the first aspect, in a third possible implementation manner, the information about the second AP set includes: first information and second information;
the first information includes signal quality of at least one AP in the second AP set and/or signal strength of at least one AP in the second AP set; and
the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

With reference to the second possible implementation manner or the third possible implementation manner of the first aspect, in a fourth possible implementation manner, the information about the third AP set includes at least one of the following:
a channel number of at least one AP in the third AP set, identification information of at least one AP in the third AP set, information about a beacon channel of at least one AP in the third. AP set, and a security parameter of at least one AP in the third. AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

With reference to the first aspect or any one of the preceding possible implementation manners of the first aspect, in a fifth possible implementation manner, after the sending information about the first AP set to the user equipment, the method further includes:
receiving identification information of the access AP sent by the user equipment or the access AP.

With reference to the fifth possible implementation manner of the first aspect, in a sixth possible implementation manner, after the receiving identification information of the access AP sent by the user equipment, the method further includes:
determining a fourth AP set according to location information of the access AP, where the fourth AP set includes at least one AP; and
notifying the user equipment of the fourth AP set.

With reference to the first aspect or any one of the preceding possible implementation manners of the first aspect, in a seventh possible implementation manner, the method further includes:

sending a first threshold to the user equipment, where the first threshold is used for the user equipment accessing the base station controller; or sending a first threshold and a second threshold to the user equipment, where the second threshold is used for the user equipment determining a switching target or a candidate target set, the candidate target set includes one or more AP, the first threshold is used for the user equipment accessing the switching target, and the switching target is an AP or the base station controller.

With reference to the seventh possible implementation manner of the first aspect, in an eighth possible implementation manner, the switching target is an AP, and the method further includes:

receiving identification information of the switching target sent by the user equipment or the switching target.

With reference to the seventh possible implementation manner or the eighth possible implementation manner of the first aspect, in a ninth possible implementation manner, the method further includes:

in a case where the switching target is an AP, receiving an association message and/or an authentication message sent by the user equipment to the switching target, and forwarding the association message and/or the authentication message to the switching target; or in a case where the candidate target set is determined, receiving an association message and/or an authentication message sent by the user equipment to t least one AP in the candidate target set, and for forwarding the association message and/or the authentication message to the at least one AP in the candidate target set.

With reference to any one of the seventh possible implementation manner to the ninth possible implementation manner of the first aspect, in a tenth possible implementation manner, the method further includes:

receiving the candidate target set notified by the user equipment;

determining a switching target from the one or more AP in the candidate target set; and notifying the user equipment of the switching target.

With reference to the seventh possible implementation manner of the first aspect, in an eleventh possible implementation manner, the method further includes:

receiving a connection establishment request or a data transmission state message sent by the user equipment, where the connection establishment request is used to reestablish a connection between the user equipment and the base station controller, and the data transmission state message is used to restore a state of data transmission between the user equipment and the base station controller.

With reference to the eleventh possible implementation manner of the first aspect, in a twelfth possible implementation manner, the data transmission state message includes a measurement report or a cell update request.

With reference to the eleventh possible implementation manner or the twelfth possible implementation manner of the first aspect, in a thirteenth possible implementation manner, the connection establishment request or the data transmission state message further includes indication information used to indicate that the WLAN is unavailable.

With reference to the first possible implementation manner, the third possible implementation manner, or the fourth possible implementation manner of the first aspect, in a fourteenth possible implementation manner, the sending time point of the beacon channel is relative time information of the beacon channel relative to a reference time of a mobile network cell.

With reference to the fourteenth possible implementation manner of the first aspect, in a fifteenth possible implementation manner, the reference time of the mobile network cell is a system frame number or connection frame number.

With reference to the first aspect or any one of the preceding possible implementation manners of the first aspect, in a sixteenth possible implementation manner, the access capability indication and the access request are carried in a radio resource control RRC connection establishment request message or an RRC connection establishment complete message; or the information about the first AP set is carried in an RRC connection establishment message, an RRC connection release message or a measurement control message.

With reference to the sixteenth possible implementation manner of the first aspect, in a seventeenth possible implementation manner, in a case where the information about the first AP set is carried in the RRC connection release message, an RRC connection to the user equipment is released.

In a second aspect, the present application provides a method for accessing a wireless local area network WLAN, the method is performed by a user equipment and includes:

sending an access capability indication or access request of the user equipment to a base station controller of a serving base station of the user equipment, so that the base station controller determines a first access point AP set in the case of receiving the access capability indication or the access request, where the first AP set includes at least one AP;

receiving information about the first AP set sent by the base station controller; and determining, according to the information about the first AP set, an access AP for accessing a WLAN.

With reference to the second aspect, in a first possible implementation manner, the information about the first AP set includes at least one of the following:

a channel number of at least one AP in the first AP set, identification information of at least one AP in the first AP set, information about a beacon channel of at least one AP in the first AP set, and a security parameter of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

With reference to the second aspect or the first possible implementation manner of the second aspect, in a second possible implementation manner, the determining, according to the information about the first AP set, an access AP for accessing a WLAN includes:

determining the access AP from the at least one AP in the first AP set.

With reference to the second aspect or the first possible implementation manner of the second aspect, in a third possible implementation manner, the determining, according to the information about the first AP set, an access AP for accessing a WLAN includes:

determining a second AP set from the at least one AP in the first AP set, where the second AP set includes at least one AP;

sending information about the second AP set to the base station controller according to the second AP set;

receiving information about a third AP set sent by the base station controller, where the third AP set is determined by the base station controller from the at least one AP in the second AP set, and the third AP set includes at least one AP; and determining the access AP from the at least one AP in the third AP set.

With reference to the third possible implementation manner of the second aspect, in a fourth possible implementation manner, the information about the second AP set includes: first information and second information;

the first information includes signal quality of at least one AP in the second AP set and/or signal strength of at least one AP in the second AP set; and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

With reference to the third possible implementation manner or the fourth possible implementation manner of the second aspect, in a fifth possible implementation manner, the information about the third AP set includes at feat one of the following:

a channel number of at least one AP in the third AP set, identification information of at least one AP in the third AP set, information about a beacon channel of at least one AP in the third AP set, and a security parameter of at least one AP in the third AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

With reference to the second aspect or any one of the preceding possible implementation manners of the second aspect, in a sixth possible implementation manner, after the determining the access AP, the method further includes:

sending identification information of the access AP to the base station controller.

With reference to the sixth possible implementation manner of the second aspect, in a seventh possible implementation manner, after the sending identification information of the access AP to the base station controller, the method further includes:

receiving a fourth AP set notified by the base station controller, where the fourth AP set includes at least one AP.

With reference to the second aspect or any one of the preceding possible implementation manners of the second aspect, in an eighth possible implementation manner, the method further includes:

receiving a first threshold sent by the base station controller, and accessing the base station controller according to the first threshold.

With reference to the second aspect or any one of the first possible implementation manner to the seventh possible implementation manner of the second aspect, in a ninth possible implementation manner, the method further includes:

receiving a first threshold and a second threshold that are sent by the base station controller, determining that a switching target is an AP or the base station controller according to the second threshold, and accessing the switching target according to the first threshold; or receiving a first threshold and a second threshold that are sent by the base station controller, determining a candidate target set according to the second threshold, where the candidate target set includes at least one AP, notifying the base station controller of the candidate target set, and receiving a switching target, where the switching target is determined by the base station controller from the at least one AP in the candidate target set, and accessing the switching target according to the first threshold.

With reference to the ninth possible implementation manner of the second aspect, in a tenth possible implementation manner, the method further includes:

in the case of determining that the switching target is an AP, sending an association message and/or an authentication message to the AP which is the switching target through the base station controller; or in the case of determining the candidate target set, sending an association message and/or an authentication message to at least one AP in the candidate target set through the base station controller.

With reference to the ninth possible implementation manner of the second aspect, in an eleventh possible implementation manner, the switching target is an AP, and the method further includes:

sending identification information of the switching target to the base station controller.

With reference to the eighth possible implementation manner of the second aspect or the ninth possible implementation manner of the second aspect, in a twelfth possible implementation manner, the accessing the base station controller includes:

sending a connection establishment request or a data transmission state message to the base station controller, where the connection establishment request is used to reestablish a connection with the base station controller, and the data transmission state message is used to restore a state of data transmission with the base station controller.

With reference to the twelfth possible implementation manner of the second aspect, in a thirteenth possible implementation manner, the data transmission state message includes a measurement report or a cell update request.

With reference to the twelfth possible implementation manner or the thirteenth possible implementation manner of the second aspect, in a fourteenth possible implementation manner, the connection establishment request or the data transmission state message further includes indication information used to indicate that the WLAN is unavailable.

With reference to the first possible implementation manner of the second aspect, the fourth possible implementation manner of the second aspect, or the fifth possible implementation manner of the second aspect, in a fifteenth possible implementation manner, the sending time point of the beacon channel is relative time information of the beacon channel relative to a reference time of a mobile network cell.

With reference to the fifteenth possible implementation manner of the second aspect, in a sixteenth possible implementation manner, the reference time of the mobile network cell is a system frame number or connection frame number.

With reference to the second aspect or any one of the preceding possible implementation manners of the second aspect, in a seventeenth possible implementation manner, the access capability indication and the access request are carried in a radio resource control RRC connection establishment request message or an RRC connection establishment complete message.

With reference to the second aspect or any one of the preceding possible implementation manners of the second aspect, in an eighteenth possible implementation manner, the information about the first AP set is carried in an RRC connection establishment message, an RRC connection release message or a measurement control message.

With reference to the eighteenth possible implementation manner of the second aspect, in a nineteenth possible implementation manner, in a case where the information about the first AP set is carried in the RRC connection release message, the method further includes: releasing an RRC connection between the user equipment and the base station controller.

In a third aspect, the present application provides a base station controller, the base station controller is a base station controller of a serving base station of a user equipment and includes:

a receiving unit, configured to receive an access capability indication or access request sent by the user equipment;

a control unit, configured to determine a first access point AP set in a case where the receiving unit receives the access capability indication or access request sent by the user equipment, where the first AP set includes at least one AP; and a sending unit, configured to send information about the first AP set to the user equipment according to the first AP set determined by the control unit, so that the user equipment determines, according to the information about the first AP set, an access AP for accessing a WLAN.

With reference to the third aspect, in a first possible implementation manner:

the receiving unit is further configured to receive information about a second AP set sent by the user equipment, where the second AP set includes at least one AP;

the control unit is further configured to determine a third AP set from the at least one AP in the second AP set, where the third AP set includes at least one AP; and the sending unit is further configured to send information about the third AP set to the user equipment, so that the user equipment determines, from the at least one AP in the third AP set, the access AP for accessing the WLAN.

With reference to the third aspect or the first possible implementation manner of the third aspect, in a second possible implementation manner:

the receiving unit is further configured to receive identification information of the access AP sent by the user equipment or the access AP.

With reference to the second possible implementation manner of the third aspect, in a third possible implementation manner:

the control unit is further configured to determine a fourth AP set according to location information of the access AP, where the fourth AP set includes at least one AP; and the sending unit is further configured to notify the user equipment of the fourth AP set.

With reference to the third aspect or any one of the preceding possible implementation manners of the third aspect, in a fifth possible implementation manner:

the sending unit is further configured to send a first threshold to the user equipment, where the first threshold is used for the user equipment accessing the base station controller; or the sending unit is further configured to send a first threshold and a second threshold to the user equipment, where the second threshold is used for the user equipment determining a switching target or a candidate target set, the candidate target set includes one or more AP, the first threshold is used for the user equipment accessing the switching target, and the switching target is an AP or the base station controller.

With reference to the fifth possible implementation manner of the third aspect, in a sixth possible implementation manner, the switching target is an AP, and the receiving unit is further configured to receive identification information of the switching target sent by the user equipment or the switching target.

With reference to the fifth possible implementation manner of the third aspect or the sixth possible implementation manner of the third aspect, in a seventh possible implementation manner:

the receiving unit is further configured to receive an association message and/or an authentication message sent by the user equipment to at least one AP in the candidate target set or the switching target; and the sending unit is further configured to forward the association message and/or the authentication message to the at least one AP in the candidate target set or the switching target.

With reference to any one of the fifth possible implementation manner to the seventh possible implementation manner of the third aspect, in an eighth possible implementation manner:

the receiving unit is further configured to receive the candidate target set notified by the user equipment;

the control unit is further configured to determine a switching target from the one or more AP in the candidate target set; and the sending unit is further configured to notify the user equipment of the switching target.

With reference to the fifth possible implementation manner of the third aspect, in ninth possible implementation manner:

the receiving unit is further configured to receive a connection establishment request or a data transmission state message sent by the user equipment; and the control unit is further configured to control reestablishment of a connection to the user equipment in a case where the receiving unit receives the connection establishment request, or control restoration of a connection to the user equipment in a case where the receiving unit receives the data transmission state message.

In a fourth aspect, the present application provides a user equipment, including:

a sending unit, configured to send an access capability indication of the user equipment or access request to a base station controller connected to a serving base station of the user equipment;

a receiving unit, configured to receive information about a first access point AP set sent by the base station controller, where the first AP set includes at least one AP; and a control unit, configured to determine, according to the information about the first AP set received by the receiving unit, an access AP for accessing a wireless local area network WLAN.

With reference to the fourth aspect, in a first possible implementation manner:

the control unit is specifically configured to determine the access AP from the at least one AP in the first AP set.

With reference to the fourth aspect, in a second possible implementation manner:

the control unit is further configured to determine a second AP set from the at least one AP in the first AP set, where the second AP set includes at least one AP;

the sending unit is further configured to send information about the second AP set to the base station controller;

the receiving unit is further configured to receive information about a third AP set sent by the base station controller, where the third AP set is determined by the base station controller from the at least one AP in the second AP set, and the third AP set includes at least one AP; and the control unit is further configured to determine the access AP from the at least one AP in the third AP set.

With reference to the fourth aspect or any one of the preceding possible implementation manners of the fourth aspect, in a third possible implementation manner:

the sending unit is further configured to send identification information of the access AP to the base station controller.

With reference to the third possible implementation manner of the fourth aspect, in a fourth possible implementation manner:

the receiving unit is further configured to receive a fourth AP set notified by the base station controller, where the fourth AP set includes at least one AP.

With reference to the fourth aspect or any one of the preceding possible implementation manners of the fourth aspect, in a fifth possible implementation manner:

the receiving unit is further configured to receive a first threshold sent by the base station controller; and the control unit is further configured to access the base station controller according to the first threshold.

With reference to the fourth aspect or any one of the first possible implementation manner to the fourth possible implementation manner of the fourth aspect, in a sixth possible implementation manner:

the receiving unit is further configured to receive a first threshold and a second threshold that are sent by the base station controller; and the control unit is further configured to determine that a switching target is an AP or the base station controller according to the second threshold, and access the AP or the base station controller according to the first threshold.

With reference to the sixth possible implementation manner of the fourth aspect, in a seventh possible implementation manner:

the sending unit is further configured to: in a case where the switching target is an AP, send an association message and/or an authentication message to the AP through the base station controller.

With reference to the sixth possible implementation manner of the fourth aspect or the seventh possible implementation manner of the fourth aspect, in an eighth possible implementation manner:

the sending unit is further configured to: in a case where the switching target is an AP, send identification information of the AP to the base station controller.

With reference to the fifth possible implementation manner of the fourth aspect or the sixth possible implementation manner of the fourth aspect, in a ninth possible implementation manner:

the sending unit is further configured to send a connection establishment request or a data transmission state message to the base station controller, so that the user equipment accesses the base station controller.

With reference to the fourth aspect or any one of the first possible implementation manner to the fourth possible implementation manner of the fourth aspect, in a tenth possible implementation manner:

the receiving unit is further configured to receive a first threshold and a second threshold that are sent by the base station controller;

the control unit is further configured to determine a candidate target set according to the second threshold, where the candidate target set includes at least one AP;

the sending unit is further configured to notify the base station controller of the candidate target set;

the receiving unit is further configured to receive information about a switching target, where the switching target is determined by the base station controller from the at least one AP in the candidate target set; and the control unit is further configured to control access to the switching target.

In embodiments of the present application, when a user equipment needs to access a WLAN through an AP to access the Internet, a base station controller may notify the user equipment of an available AP. In this way, the user equipment can access the WLAN directly through the available AP and does not need to request a password from an operator and enter the password during access.

BRIEF DESCRIPTION OF DRAWINGS

To illustrate the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
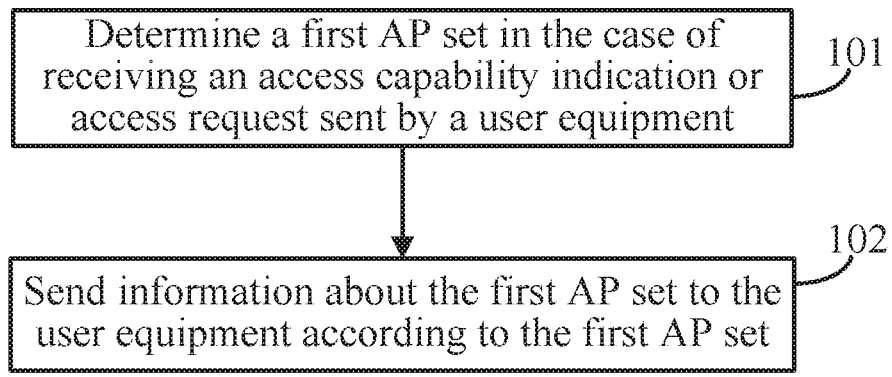
FIG. 1 is a schematic flowchart of a method for accessing a wireless local area network according to an embodiment of the present application.

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

It should be understood that the technical solutions in the embodiments of the present application may be applied to various communications systems, for example, a global system of mobile communications ("GSM" for short) system, a code division multiple access ("CDMA" for short) system, a wideband code division multiple access ("WCDMA" for short) system, a general packet radio service ("GPRS" for short), a long term evolution ("LTE" for short) system, an LTE frequency division duplex ("FDD" for short) system, LTE time division duplex ("TDD" for short), and a universal mobile telecommunication system ("UNITS" for short) and the like.

A UE, may also be called a mobile terminal (MT), a mobile user equipment, or the like, and is capable of communicating with at least one core networks through a radio access network (for example, Radio Access Network, RAN). The user equipment may be a mobile terminal, for example a mobile phone (or called a "cellular" phone), or a computer having a mobile terminal, for example, a portable, pocket, handheld, computer-embedded, or vehicle-mounted mobile apparatus.

A base station may be a base station (Base Transceiver Station, BTS) in the GSM or the CDMA, a base station (Node B) in the WCDMA, or an eNB or e-NodeB in the LTE, which is not limited in the present application.

A base station controller may be a BSC (base station controller), an RNC (radio network controller), or an eNode B (evolved Node B), which is not limited in the present application. The base station controller is connected with an AP for information exchange.

An AP described in this document refers to a WLAN AP. The user equipment may be connected with the Internet through the AP. The AP may be an independent AP controlled and managed by an AC (access controller), or an AP including an AC function, and may also form a special base station with a base station, which is not limited in the present application.

A WLAN may be wireless fidelity (WiFi) or worldwide interoperability for microwave access (WiMAX), which is not limited in the present application.

The mobile network described in this document may be various communications systems, for example, a Global System of Mobile Communication ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, LTE time division duplex ("TDD" for short), and a Universal Mobile Telecommunication System ("UNITS" for short).

FIG. 1 is a schematic flowchart of a method for accessing a WLAN according to an embodiment of the present application. The method in FIG. 1 is performed by a base station controller of a serving base station of a user equipment.

101. Determine a first AP set in the case of receiving an access capability indication or access request sent by the user equipment, where the first AP set includes at least one AP, and the access capability indication sent by the user equipment is used to indicate that the user equipment is capable of accessing a WLAN through an AP.

102. Send information about the first AP set to the user equipment according to the first AP set, so that the user equipment determines, according to the information about the first AP set, an access AP for accessing the WLAN.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

The sending time point of the beacon channel refers to relative time information of the beacon channel relative to a reference time of a mobile network cell. The reference time of the mobile network cell may be a system frame number and may also be connection frame number. The user equipment calculates, according to the relative time of the beacon channel and the reference time of the mobile network cell, a time when the beacon channel possibly appears, so as to accelerate AP search. For example, the reference time of the mobile network cell of the beacon channel is SFN (System Frame Number, system frame number) 1, and a period is 100 milliseconds; because a time length of each SFN is 10 milliseconds, reference time points at which the beacon channel possibly appears are SFN 1, SFN 11, and SFN 21; therefore, the user equipment does not need to wait all the time for the beacon channel to appear and may search for the beacon channel only at the reference time points to improve search efficiency, thereby accelerating the search.

Optionally, identification information of an AP or access AP in the set is a unique identifier corresponding to the AP, for example, a basic service set identifier (BSSM), a service set identifier (SSID), an extended service set identifier (ESSID), or a media access control (MAC) address.

According to the preceding method, when a user equipment needs to access a WLAN through an AP to access the Internet, a base station controller may notify the user equipment of an available AP. In this way, the user equipment can access the WLAN directly through the available AP and does not need to request a password from an operator and enter the password during access.

Figure 2:
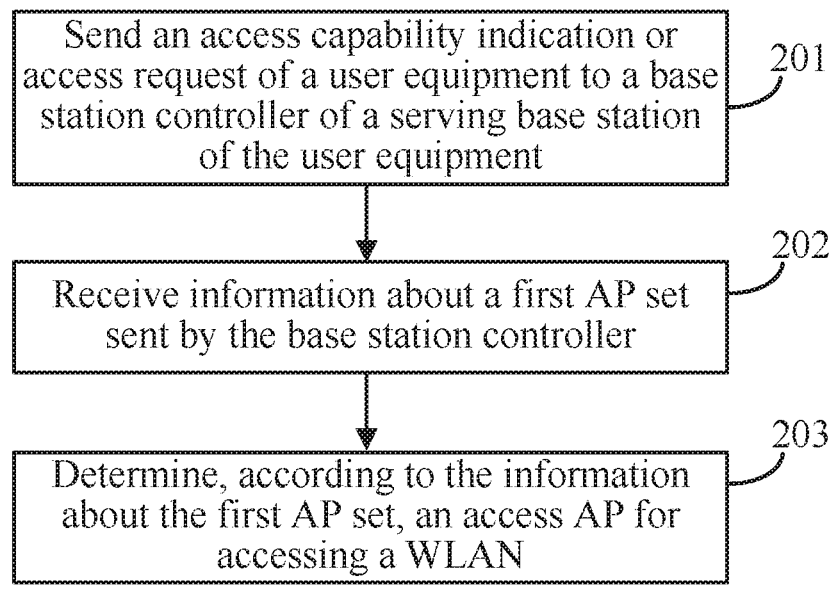
FIG. 2 is a schematic flowchart of a method for accessing a wireless local area network according to an embodiment of the present application.

FIG. 2 is a schematic flowchart of a method for accessing a WLAN according to an embodiment of the present application. The method in FIG. 2 is performed by a user equipment.

201. Send an access capability indication or access request of the user equipment to a base station controller of a serving base station of the user equipment, so that the base station controller determines a first AP set in the case of receiving the access capability indication or the access request, where the first AP set includes at least one AP, and the access capability indication sent by user equipment is used to indicate that the user equipment is capable of accessing a WLAN through an AP.

202. Receive information about the first AP set sent by the base station controller.

203. Determine, according to the information about the first AP set, an access AP for accessing the WLAN.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

Optionally, identification information of an AP or access AP in the set is a unique identifier corresponding to the AP, for example, a BSSID, an SSID, an ESSID, or a MAC address.

According to the preceding method, when a user equipment needs to access a WLAN through an AP to access the Internet, a base station controller may notify the user equipment of an available AP. In this way, the user equipment can access the WLAN directly through the available AP and does not need to request a password from an operator and enter the password during access.

Figure 3:
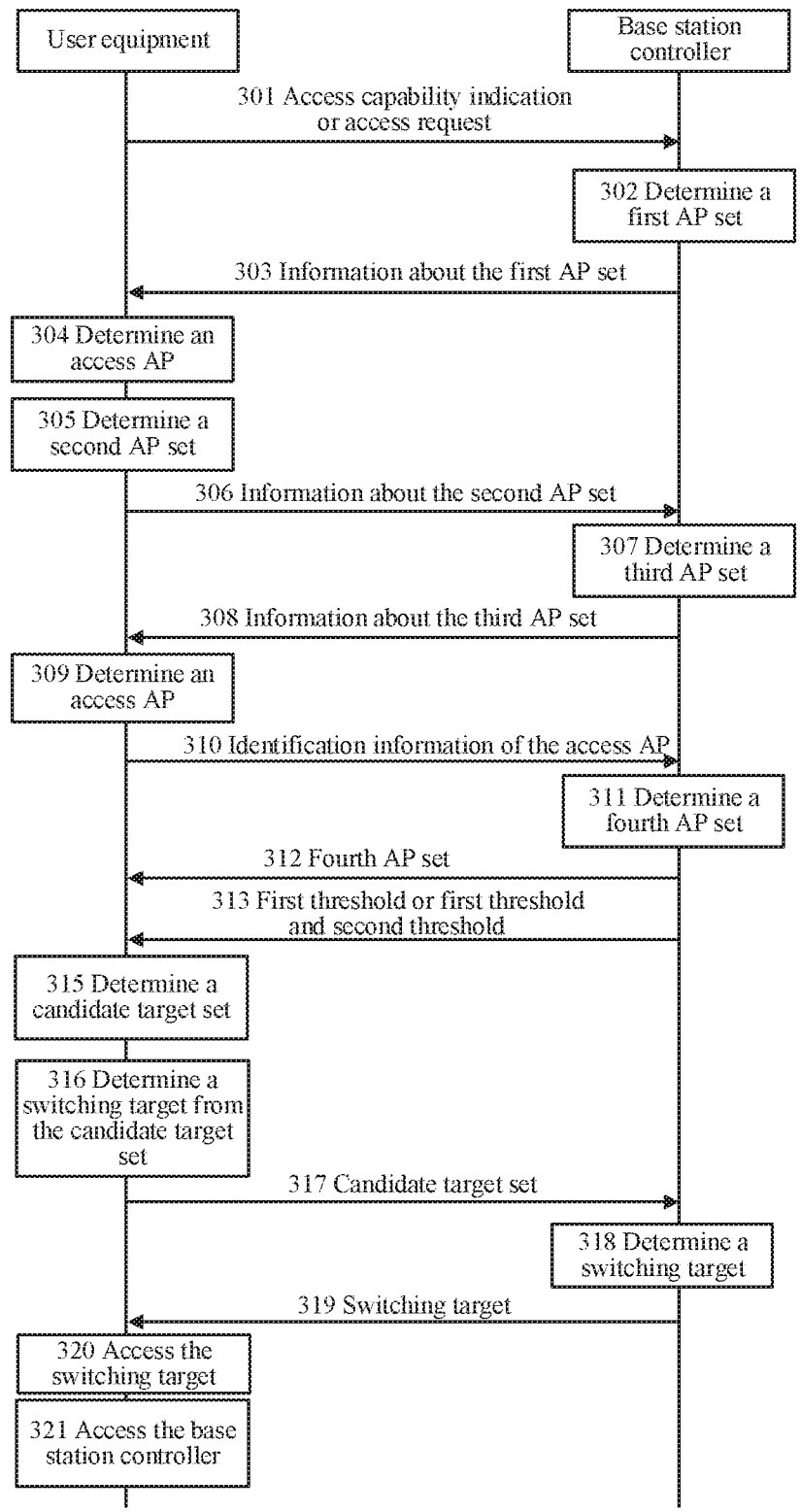
FIG. 3 is a schematic flowchart of a method for accessing a wireless local area network according to an embodiment of the present application.

FIG. 3 is a schematic flowchart of a method for accessing a WLAN according to an embodiment of the present application.

301. A user equipment sends an access capability indication or an access request to a base station controller of a serving base station of the user equipment, where the access capability indication is used to indicate that the user equipment is capable of accessing a WLAN through an AP.

Optionally, the access capability indication and the access request may be carried in a radio resource control (RRC) connection establishment request message or an RRC connection establishment complete message. The RRC connection establishment request message is the first message sent by the user equipment to a mobile network, and the RRC connection establishment complete message is the first dedicated message sent by the user equipment to the mobile network. Using the RRC connection establishment request message or the RRC connection establishment complete message to bear the access capability indication and the access request helps the base station controller quickly perform WLAN access control according to the access request.

302. The base station controller determines a first AP set in the case of receiving the access capability indication or the access request, where the first AP set includes at least one AP.

303. The base station controller sends information about the first AP set to the user equipment according to the first AP set.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal quality of at least one AP in the first AP set, and transmit signal strength of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

Optionally, the information about the first AP set may be carried in an RRC connection establishment message, an RRC connection release message or a measurement control message. In a case where the information about the first AP set is carried in the RRC connection release message, the base station controller releases an RRC connection to the user equipment.

304. In the case of receiving the information about the first AP set, the user equipment determines, from the at least one AP in the first AP set, an access AP for accessing the WLAN.

Optionally, in a case where the first AP set includes only one AP, the user equipment determines that the access AP is the AP. The user equipment may further determine at least one of the following according to the information about the first AP set: signal strength of at least one AP in the first AP set, signal quality of at least one AP in the first AP set, and a path loss of at least one AP in the first AP set. The user equipment may select an AP with the highest signal quality or signal strength in the first AP set as the access AP, and may also select an AP with the lowest path loss in the first AP set as the access AP.

305. The user equipment may determine a second AP set from the at least one AP in the first AP set in the case of receiving the information about the first AP set, where the second AP set includes at least one AP.

Optionally, in the case of receiving the information about the first AP set, the user equipment may determine at least one of the following according to the information about the first AP set: the signal strength of the at least one AP in the first AP set, the signal quality of the at least one AP in the first AP set, and the path loss of the at least one AP in the first AP set. The user equipment may determine an AP in the second AP set from the at least one AP in the first AP set according to a preset condition. For example, the user equipment may determine an AP whose signal quality or signal strength is higher than a specified threshold as an AP in the second AP set, and the user equipment may also determine, according to a specified proportion, an AP whose signal quality or signal strength ranks high as an AP in the second AP set. It should be noted that the preceding method is only an example, a method for determining an AP in the second. AP set is not limited to the preceding method.

306. The user equipment sends information about the second AP set to the base station controller according to the second AP set.

Optionally, the information about the second AP set includes: first information and second information, where the first information includes at least one of the following: signal quality of the at least one AP in the second AP set, signal strength of the at least one AP in the second AP set, and a path loss of the at least one AP in the second AP set, and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

307. The base station controller determines a third AP set from the at least one AP in the second AP set, where the third AP set includes at least one AP.

Optionally, the base station controller may determine the third AP set from the at least one AP in the second AP set according to a preset condition. For example, the base station controller may determine an AP whose signal quality or signal strength is higher than a specified threshold as an AP in the third AP set, the base station controller may also determine, according to a specified proportion, an AP whose signal quality or signal strength ranks high as an AP in the third AP set, and the base station controller r ray also determine an AP in the third AP set according to other information (for example, load and a congestion degree of a backhaul) about the at least one AP in the second AP set. It should be noted that the preceding method is only an example, a method for determining an AP in the third AP set is not limited to the preceding method.

308. The base station controller sends information about the third AP set to the user equipment according to the third AP set.

Optionally, the information about the third. AP set includes at least one of the following: a channel number of at least one AP in the third AP set, identification information of at least one AP in the third AP set, information about a beacon channel of at least one AP in the third AP set, a security parameter of at least one AP in the third AP set, transmit signal strength of at least one AP in the third AP set, and transmit signal quality of at least one AP in the third AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

309. The user equipment determines, from the third AP set, an access AP for accessing the WLAN.

Optionally, in a case where only one AP exists in the third AP set, the access AP is the AP. In a case where more than one AP exists in the third AP set, the user equipment may select an AP with the highest signal quality or signal strength in the third AP set as the access AP, and may also select an AP with the lowest path loss in the third AP set as the access AP. The signal strength, signal quality, or path loss of an AP in the third AP set may be determined by the user equipment according to the information about the third AP set.

1t should be noted that the user equipment may determine the access AP by performing step 304, or the user equipment may also determine the access AP by performing step 305 to step 309. If the user equipment determines the access AP by performing step 304, the access AP can be determined quickly; if the user equipment determines the access AP by performing step 305 to step 309, an AP with higher signal quality and/or signal strength can be determined.

310. The user equipment or the access AP sends identification information of the access AP to the base station controller.

Optionally, the user equipment may send the identification information of the access AP to the base station controller after determining the access AP, and the user equipment may also send the identification information of the access AP to the base station controller after determining the access AP and accessing the WLAN through the access AP. The access AP may send the identification information of the access AP to the base station controller after the access of the user equipment.

311. After receiving the identification information of the access AP, the base station controller may determine a fourth AP set according to location information of the user equipment, where the fourth AP set includes at least one AP.

Specifically, the base station controller may determine at least one AP whose coverage includes a location of the user equipment as an AP in the fourth AP set, and may also determine at least one AP whose coverage is adjacent to a search scope in which the user equipment is capable of performing AP search as an AP in the fourth AP set.

Optionally, all APs in the fourth AP set may belong to the first AP set or the third AP set, or the at least one AP in the fourth AP set may not belong to the first AP set or the third AP set.

312. The base station controller notifies the user equipment of the fourth AP set. The user equipment may determine a switching target or a candidate target set by using the fourth AP set.

Optionally, in a case where all APs in the fourth AP set belong to the first AP set or the third AP set, the base station controller may send only indication information to the user equipment, and the user equipment may determine information about the fourth AP set from the received information about the first AP set and/or the received information about the third AP set according to the indication information.

Optionally, in a case where the fourth AP set is the same as the first AP set or the third AP set, the base station controller may notify the user equipment that the fourth AP set is identical with the first AP set or the third AP set. The user equipment may determine a switching target or a candidate target set by using the first AP set or the third AP set.

Optionally, the base station controller may further send the information about the fourth AP set to the user equipment.

Optionally, the information about the fourth AP set includes at least one of the following: a channel number of at least one AP in the fourth AP set, identification information of at least one AP in the fourth AP set, information about a beacon channel of at least one AP in the fourth AP set, a security parameter of at least one AP in the fourth AP set, transmit signal strength of at least one AP in the fourth AP set, and transmit signal quality of at least one AP in the fourth AP set, where the information about the beacon channel of the at least one AP in the fourth AP set is a transmission time and period of the beacon channel of the at least one AP in the fourth AP set, the transmission time of the beacon channel is a relative time relative to a reference time of the mobile network, and the security parameter of the at least one AP in the fourth AP set includes a key used for access and/or an authentication type.

313. The user equipment receives a first threshold or a first threshold and a second threshold sent by the base station controller. Optionally, step 313 may be performed with any one of the following steps: step 303, step 308, and step 312. Step 313 may also be an independent step performed before or after any one of step 302 to step 312.

Optionally, the first threshold and/or the second threshold may be signal quality or signal strength. Measurement information corresponds to the first threshold and/or the second threshold and may be signal quality or signal strength.

Optionally, step 321 is performed in a case where the user equipment receives only the first threshold. In a case where the user equipment receives the first threshold and the second threshold, any one of the following combinations of steps may be performed: step 314 and step 320; step 315, step 316, and step 320; step 315, step 317, step 318, step 319, and step 320; and step 314 and step 321.

314. After receiving the second threshold sent by the base station controller, the user equipment determines a switching target in a case where measurement information of the access AP is lower than the second threshold, where the user equipment determines, according to the second threshold, that the switching target may be an AP or the base station controller.

Specifically, after accessing the access AP, the user equipment needs to detect signal quality and/or signal strength of the access AP all the time. If the measurement information (signal quality or signal strength) of the access AP is lower than the second threshold, the user equipment measures measurement information of the at least one AP in the fourth AP set.

In a case where at least one AP whose measurement information is not lower than the second threshold exists in the fourth AP set, the user equipment may determine an AP (for example, select an AP with the highest signal quality or signal strength) as the switching target from the at least one AP whose measurement information is not lower than the second threshold.

Optionally, the user equipment may further perform an authentication procedure and/or an association procedure with the AP through the base station controller, so that the AP confirms the identity of the user equipment.

Step 320 is performed in a case where the user equipment determines that the switching target is an AP.

In a case where no AP whose measurement information is not lower than the second threshold exists in the fourth AP set, the user equipment determines that the switching target is the base station controller. Step 321 performed in a case where the user equipment determines that the switching target is the base station controller.

315. After receiving the second threshold sent by the base station controller, the user equipment determines a candidate target set in a case where measurement information of the measured access AP is lower than the second threshold, where the candidate target set includes at least one AP.

Specifically, after accessing the access AP, the user equipment needs to detect signal quality and/or signal strength of the access AP all the time. If the measurement information (signal quality or signal strength) of the access AP is lower than the second threshold, the user equipment measures measurement information of the at least one AP in the fourth AP set. In a case where at least one AP whose measurement information is not lower than the second threshold exists in the fourth AP set, the user equipment may determine the candidate target set from the at least one AP whose measurement information is not lower than the second threshold. For example, the user equipment may determine an AP whose measurement information is higher than a specified threshold as an AP in the candidate target set, and the user equipment may also determine, according to a specified proportion, an AP whose measurement information ranks high as an AP in the candidate target set. It should be noted that the preceding method is only an example, a method for determining an AP in the candidate target set is not limited to the preceding method.

316. The user equipment may determine a switching target from the at leak one AP in the candidate target set.

Optionally, the user equipment may further perform an authentication and/or an association procedure with the at least one AP in the candidate target set through the base station controller, so that the at least one AP in the candidate target set confirms the identity of the user equipment. Specifically, the user equipment may send authentication information and/or association information to the at least one AP in the candidate target set through the base station controller. The user equipment may select one AP (for example, select an AP with the highest signal quality or signal strength) as the switching target from at least one AP on which association and authentication have been completed in the candidate target set.

317. The base station controller receives the candidate target set notified by the user equipment.

Specifically, the user equipment may send indication information to the base station controller, and the base station controller may determine information about the candidate target set from the determined fourth AP set according to the indication information. The user equipment may also send the information about the candidate target set to the base station controller.

Optionally, the information about the candidate target set includes third information and fourth information, where the third information includes at least one of the following: signal quality of at least one AP in the candidate target set, signal strength of at least one AP in the candidate target set, and a path loss of at least one AP in the candidate target set; and the fourth information includes at least one of the following: a channel number of at least one AP in the candidate target set, identification information of at least one AP in the candidate target set, and information about a beacon channel of at least one AP in the candidate target set, where the information about the beacon channel of the at least one AP in the candidate target set is a transmission time and period of the beacon channel of the at least one AP in the candidate target set, and the transmission time of the beacon channel is a relate e time relative to a reference time of the mobile network.

318. The base station controller may determine a switching target from the at least one AP in the candidate target set.

Optionally, the base station controller may determine the switching target according to the information about the candidate target set and/or other information (for example, load and a congestion degree of a backhaul) about the at least one AP in the candidate target set. For example, the base station controller may select an AP with the highest signal quality or signal strength as the switching target.

Optionally, the user equipment may further perform an authentication and/or an association procedure with the at least one AP in the candidate target set through the base station controller, so that the at least one AP in the candidate target set confirms the identity of the user equipment. Specifically, the user equipment may send authentication information and/or association information to the at least one AP in the candidate target set through the base station controller. The base station controller may select one AP (for example, select an AP with the highest signal quality or signal strength) as the switching target from at least one AP on which association and authentication have been completed in the candidate target set.

319. The base station controller notifies the user equipment of the switching target.

Specifically, the base station controller may send indication information to the user equipment, and the user equipment may determine information about the switching target from the determined candidate target set according to the indication information. The base station controller may also send the information about the switching target to the user equipment.

Optionally, the information about the switching target includes at least one of the following: a channel number of the switching target, identification information of the switching target, information about a beacon channel of the switching target, and a security parameter of the switching target, where the information about the beacon channel of the switching target is a transmission time and period of the beacon channel of the switching target, the transmission time of the beacon channel is a relative time relative to a reference time of the mobile network, and the security parameter of the switching target includes a key used for access and/or an authentication type.

320. In a case where the user equipment determines that the measurement information of the access AP is lower than the first threshold and the user equipment determines that the switching target is an AP, the user equipment disconnects from the access AP, accesses the switching target, and performs data connection through the switching target to access the Internet. Further, the user equipment may further send the identification information of the switching target to the radio network controller. The case in which the user equipment determines that the switching target is an AP includes the following: The user equipment may directly determine that the switching target is an AP, the user equipment may determine the switching target from the candidate target set, or the user equipment may also receive the switching target determined by the base station controller.

321. In a case where the user equipment determines that the measurement information of the access AP is lower than the first threshold and the user equipment needs to access the base station controller, the user equipment disconnects from the access AP, accesses the base station controller, and performs data connection through the base station controller to access the Internet. The case in which the user equipment needs to access the base station controller includes the following: The user equipment receives only the first threshold, or the user equipment determines that the switching target is the base station controller according to the second threshold.

Specifically, after accessing the access AP, the user equipment needs to detect signal quality and/or signal strength of the access AP all the time. If the measurement information (signal quality or signal strength) of the access AP is lower than the first threshold, the user equipment may send a connection establishment request or a data transmission state message to the base station controller. Specifically, in a case where no connection to the base station controller exists, the user equipment sends a connection establishment request to the base station controller, so as to reestablish a connection with the base station controller; in a case where a connection to the base station controller is not released, the user equipment sends a data transmission state message to the base station controller, so as to restore data transmission with the base station controller, where the data transmission state message includes a message such as a measurement report and a cell update request. Further, the connection establishment request or the data transmission state message may further include indication information used to indicate that the WLAN is unavailable. After the user equipment sends the connection establishment request or the data transmission state message to the base station controller, the user equipment may disconnect from the access AP, access the base station controller, and perform data connection with the base station controller to access the Internet.

Optionally, if the user equipment does not receive a first switching threshold configuration, or signal quality or signal strength of the access AP is not lower than the first switching threshold but the signal quality or the signal strength of the access AP is not sufficient to support data transmission of the user equipment, the user equipment may also directly send a connection establishment request or a data transmission state message to the base station controller. Specifically, in a case where no connection to the base station controller exists, the user equipment sends a connection establishment request to the base station controller, so as to reestablish a connection with the base station controller; in a case where a connection to the base station controller is not released, the user equipment sends a data transmission state message to the base station controller, so as to restore data transmission with the base station controller, where the data transmission state message includes a message such as a measurement report and a cell update request. Further, the connection establishment request or the data transmission state message may further include indication information used to indicate that the WLAN is unavailable. After the user equipment sends the connection establishment request or the data state restoration indication to the base station controller, the user equipment may disconnect from the access AP, access the base station controller, and perform data connection with the base station controller to access the Internet.

Optionally, identification information of an AP, an access AP, or a switching target in the set is a unique identifier corresponding to the AP, for example, a BSSID, an SSID, an ESSID, or a MAC address.

According to the preceding method, when a user equipment needs to access a WLAN through an AP to access the the Internet, a base station controller may notify the user equipment of an available AP. In this way, the user equipment can access the WLAN directly through the available AP and does not need to request a password from an operator and enter the password during access.

According to the preceding method, the base station controller may notify the user equipment of an AP to which the user equipment can be switched, so as to assist the user equipment in accessing the AP to which the user equipment can be switched or the base station controller in the case of relatively poor signal quality or signal strength of an access AP. The user equipment can directly access the AP to which the user equipment can be switched or the base station controller, and does not need to request, from an operator, a password of the AP to which the user equipment can be switched and enter the password during the access. In this way, a switching procedure is smoother.

Figure 4:
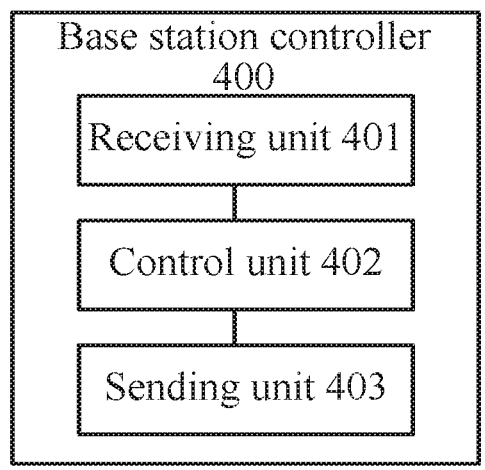
FIG. 4 is a schematic block diagram of a base station controller according to an embodiment of the present application.

FIG. 4 is a schematic block diagram of a base station controller according to an embodiment of the present application. The base station controller 400 is a base station controller of a serving base station of a user equipment and can perform the steps performed by the base station controller in the preceding methods. The base station controller 400 includes a receiving unit 401, a control unit 402, and a sending unit 403.

The receiving unit 401 is configured to receive an access capability indication or access request sent by the user equipment.

The control unit 402 is configured to determine a first AP set in a case where the receiving unit 401 receives the access capability indication or access request sent by the user equipment.

The sending unit 403 is configured to send information about the first AP set to the user equipment according to the first AP set determined by the control unit 402, so that the user equipment determines, according to the information about the first AP set, an access AP for accessing a WLAN.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

Optionally, identification information of an AP or access AP in the set is a unique identifier corresponding to the AP, for example, a BSSID, an SSID, an ESSID, or a MAC address.

According to the base station controller 400, when a user equipment needs to access a WLAN through an AP to access the Internet, the base station controller may notify the user equipment of an available AP. In this way, the user equipment can access the WLAN directly through the available AP and does not need to request a password from an operator and enter the password during access.

Figure 5:
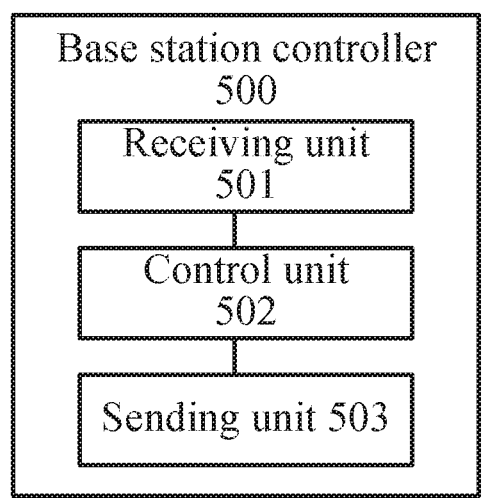
FIG. 5 is a schematic block diagram of another base station controller according to an embodiment of the present application.

FIG. 5 is a schematic block diagram of another base station controller according to an embodiment of the present application. The base station controller 500 is a base station controller of a serving base station of a user equipment and can perform the steps performed by the base station controller in the preceding methods. The base station controller 500 is an embodiment of the base station controller 400. The base station controller 500 includes a receiving unit 501, a control unit 502, and a sending unit 503.

The receiving unit 501 is configured to receive an access capability indication or access request sent by the user equipment, where the access capability indication is used to indicate that the user equipment is capable of accessing a WLAN through an AP.

Optionally, the access capability indication and the access request may be carried in a radio resource control (Radio Resource Control, RRC) connection establishment request message or an RRC connection establishment complete message. The RRC connection establishment request message is the first message sent by the user equipment to a mobile network, and the RRC connection establishment complete message is the first dedicated message sent by the user equipment to the mobile network. Using the RRC connection establishment request message or the RRC connection establishment complete message to bear the access capability indication and the access request helps the base station controller quickly perform WLAN access control according to the access request.

The control unit 502 is configured to determine a first AP set in a case where the receiving unit 501 receives the access capability indication or the access request, where the first AP set includes at least one AP.

The sending unit 503 is configured to send information about the first AP set to the user equipment according to the first AP set determined by the control unit.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one Ap in the first AP set, and transmit signal quality of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type. Optionally, the information about the first AP set may be carried in an RRC connection establishment message, an RRC connection release message or a measurement control message. In a case where the information about the first AP set is carried in the RRC connection release message, the base station controller releases an RRC connection to the user equipment.

The receiving unit 501 is further configured to receive information about a second AP set sent by the user equipment.

Optionally, the information about the second AP set includes: first information and second information, where the first information includes at least one of the following: signal quality of at least one AP in the second AP set, signal strength of at least one AP in the second AP set, and a path loss of at least one AP in the second AP set, and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

The control unit 502 is further configured to determine a third AP set from the second AP set, where the third AP set includes at least one AP.

Optionally, the control unit 502 may determine the third AP set from the at least one AP in the second AP set according to a preset condition. For example, the control unit 502 may determine an AP whose signal quality or signal strength is higher than a specified threshold as an AP in the third AP set, the control unit 502 may also determine, according to a specified proportion, an AP whose signal quality or signal strength ranks high as an AP in the third AP set, and the control unit 502 may also determine an AP in the third AP set according to other information (for example, load and a congestion degree of a backhaul) about the at least one AP in the second AP set. It should be noted that the preceding method is only an example, a method for determining an AP in the third AP set is not limited to the preceding method.

The sending unit 503 is further configured to send information about the AP set determined by the control unit 502 to the user equipment.

Optionally, the information about the third. AP set includes at least one of the following: a channel number of at least one AP in the third AP set, identification information of at least one AP in the third AP set, information about a beacon channel of at least one AP in the third AP set, a security parameter of at least one AP in the third AP set, transmit signal strength of at least one AP in the third AP set, and transmit signal quality of at least one AP in the third AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

The receiving unit 501 is further configured to receive identification information of the access AP sent by the user equipment or the access AP.

Optionally, the access AP may be determined by the user equipment from the first AP set, and the access AP may also be determined by the user equipment from the third AP set. If the user equipment determines the access AP from the first AP set, the access AP can be determined quickly; if the user equipment determines the access AP from the third AP set, an AP with higher signal quality and/or signal strength can be determined.

The control unit 502 is further configured to determine a fourth AP set according to location information of the user equipment after the receiving unit 501 receives the identification information of the access AP, where the fourth AP set includes at least one AP.

Specifically, the control unit 502 may determine at least one AP whose coverage includes a location in which the user equipment is located as an AP in the fourth AP set, and may also determine at least one AP whose coverage is adjacent to a search scope in which the user equipment is capable of performing AP search as an AP in the fourth AP set.

Optionally, all APs in the fourth AP set may belong to the first AP set or the third AP set, or the at least one AP in the fourth AP set may not belong to the first AP set or the third AP set.

The sending unit 503 is further configured to notify the user equipment of the fourth AP set. The user equipment may determine a switching target or a candidate target set by using the fourth AP set.

Optionally, in a case where all APs in the fourth AP set belong to the first AP set or the third AP set, the sending unit 503 may send only indication information to the user equipment, and the user equipment may determine information about the fourth AP set from the received information about the first AP set and/or the received information about the third AP set according to the indication information.

Optionally, in a case where the fourth AP set is the same as the first AP set or the third AP set, the sending unit 503 may notify the user equipment that the fourth. AP set is identical with the first AP set or the third AP set. The user equipment may determine a switching target or a candidate target set by using the first AP set or the third AP set.

Optionally, the base station controller may further send the information about the fourth AP set to the user equipment.

Optionally, the information about the fourth AP set includes at least one of the following: a channel number of at least one AP in the fourth AP set, identification information of at least one AP in the fourth AP set, information about a beacon channel of at least one AP in the fourth AP set, a security parameter of at least one AP in the fourth AP set, transmit signal strength of at least one AP in the fourth AP set, and transmit signal quality of at least one AP in the fourth AP set, where the information about the beacon channel of the at least one AP in the fourth AP set is a transmission time and period of the beacon channel of the at least one AP in the fourth AP set, the transmission time of the beacon channel is a relative time relative to a reference time of the mobile network, and the security parameter of the at least one AP in the fourth AP set includes a key used for access and/or an authentication type.

The sending unit 503 is further configured to send a first threshold or a first threshold and a second threshold to the user equipment.

Optionally, the sending unit 503 may send the first threshold or the first threshold and the second threshold together with the information about the first AP set or the information about the third AP set, or before or after sending the information about the first AP set or the information about the third AP set. The sending unit 503 may also send the first threshold or the first threshold and the second threshold at the time of notifying the fourth AP set, and may also send the first threshold or the first threshold and the second threshold before or after notifying the fourth AP set.

Optionally, the first threshold and/or the second threshold may be signal quality or signal strength. The measurement information corresponds to the first threshold and/or the second threshold and may be signal quality or signal strength.

The receiving unit 501 is further configured to receive the candidate target set notified by the user equipment.

Specifically, the receiving unit 501 may receive indication information sent by the user equipment, and the control unit 502 may determine information about the candidate target set from the determined fourth AP set according to the indication information. The receiving unit 501 may further receive the information about the candidate target set sent by the user equipment.

Optionally, the information about the candidate target set includes third information and fourth information, where the third information includes at least one of the following: signal quality of at least one AP in the candidate target set, signal strength of at least one AP in the candidate target set, and a path loss of at least one AP in the candidate target set; and the fourth information includes at least one of the following: a channel number of at least one AP in the candidate target set, identification information of at least one AP in the candidate target set, and information about a beacon channel of at least one AP in the candidate target set, where the information about the beacon channel of the at least one AP in the candidate target set is a transmission time and period of the beacon channel of the at least one AP in the candidate target set, and the transmission time of the beacon channel is a relative time relative to a reference time of the mobile network.

The control unit 502 is further configured to determine a switching target from the at least one AP in the candidate target set.

Optionally, the control unit 502 may determine the switching target according to the information about the candidate target set and/or other information (for example, load and a congestion degree of a backhaul) about the at least one AP in the candidate target set. For example, the control unit 502 may select an AP with the highest signal quality or signal strength as the switching target.

The receiving unit 501 is further configured to receive authentication information and/or association information sent by the user equipment, and the sending unit 503 is further configured to forward the authentication information and/or the association information to the at least one AP in the candidate target set. The control unit 502 is further configured to select one AP (for example, select an AP with the highest signal quality or signal strength) as the switching target from an AP on which association and/or authentication has been completed.

The sending unit 503 is further configured to notify the switching target determined by the control unit 502 to the user equipment.

Specifically, the sending unit 503 may send indication information to the user equipment, and the user equipment may determine information about the switching target from the determined candidate target set according to the indication information. The sending unit 503 may also send the information about the switching target to the user equipment.

Optionally, the information about the switching target includes at least one of the following: a channel number of the switching target, identification information of the switching target, information about a beacon channel of the switching target, and a security parameter of the switching target, where the information about the beacon channel of the switching target is a transmission time and period of the beacon channel of the switching target, the transmission time of the beacon channel is a relative time relative to a reference time of the mobile network, and the security parameter of the switching target includes a key used for access and/or an authentication type.

The receiving unit 501 is further configured to: in a case where the switching target is an AP and the AP is determined by the user equipment, receive identification information of the switching target sent by the user equipment and/or the switching target.

The receiving unit 501 is further configured to receive a connection establishment request or a data transmission state message sent by the user equipment.

The control unit 502 is further configured to reestablish a connection with the user equipment in a case where the receiving unit 501 receives the connection establishment request. Alternatively, the control unit 502 is further configured to restore a connection with the user equipment in a case where the receiving unit 501 receives the data transmission state message.

Optionally, the data transmission state message includes a message such as a measurement report and a cell update request. Further, the connection establishment request or the data transmission state message may further include indication information used to indicate that the WLAN is unavailable.

Optionally, identification information of an AP, an access AP, or a switching target in the set is a unique identifier corresponding to the AP, for example, a BSSID, an SSID, an ESSID, or a MAC address.

According to the base station controller 500, when a user equipment needs to access a WLAN through an AP to access the Internet, the base station controller may notify the user equipment of an available AP. It this way, the user equipment can access the WLAN directly through the available AP and does not need to request a password from an operator and enter the password during access.

According to the base station controller 500, the base station controller may notify the user equipment of an AP to which the user equipment can be switched, so as to assist the user equipment in accessing the AP to which the user equipment can be switched or the base station controller in the case of relatively poor signal quality or signal strength of an access AP. The user equipment can directly access the AP to which the user equipment can be switched or the base station controller, and does not need to request, from an operator, a password of the AP to which the user equipment can be switched and enter the password during the access. In this way, a switching procedure is smoother.

Figure 6:
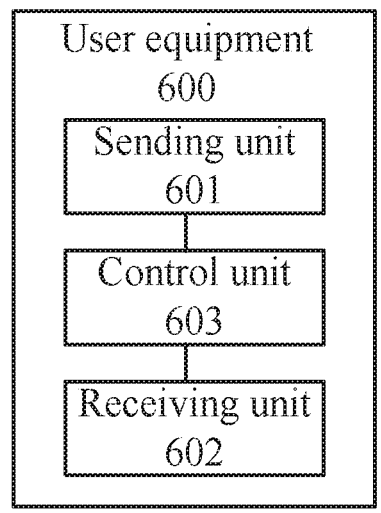
FIG. 6 is a schematic block diagram of a user equipment according to an embodiment of the present application.

FIG. 6 is a schematic block diagram of a user equipment according to an embodiment of the present application. The user equipment 600 can perform the steps performed by the user equipment in the preceding methods. The user equipment 600 includes a sending unit 601, a receiving unit 602, and a control unit 603.

The sending unit 601 is configured to send an access capability indication or access request of the user equipment to a base station controller of a serving base station of the user equipment, so that the base station controller determines a first AP set in the case of receiving the access capability indication or the access request, where the first AP set includes at least one AP, and the access capability indication sent by the user equipment is used to indicate that the user equipment is capable of accessing a WLAN through an AP.

The receiving unit 602 is configured to receive information about the first AP set sent by the base station controller.

The control unit 603 is configured to determine, according to the information about the first AP set, an access AP for accessing the WLAN.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one AP in the first AP set, where the information about the beacon channel of the at least one AP in the first AP set is a sending tune point and period of the beacon channel of the at least one AP in the first AP set, and the security parameter of the at least one AP in the first AP set includes a key used for access and/or an authentication type.

Optionally, identification information of an AP or access AP in the set is a unique identifier corresponding to the AP, for example, a BSSID, an SSID, an ESSID, or a MAC address.

According to the user equipment 600, when the user equipment needs to access a WLAN through an AP to access the Internet, a base station controller may notify the user equipment of an available AP. In this way, the user equipment can access the WLAN directly through the available AP and does not need to request a password from an operator and enter the password during access.

Figure 7:
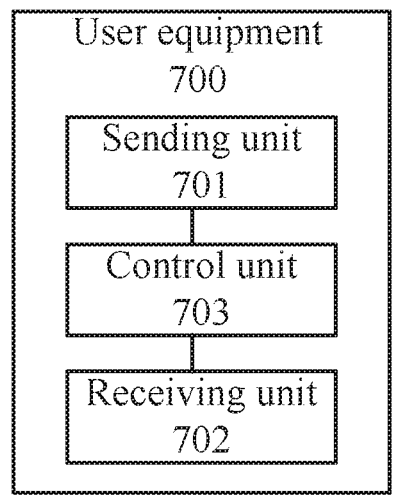
FIG. 7 is a schematic block diagram of another user equipment according to an embodiment of the present application.

FIG. 7 is a schematic block diagram of another user equipment according to an embodiment of the present application. The user equipment 700 can perform the steps performed by the user equipment in the preceding methods. The user equipment 700 is an embodiment of the user equipment 600. The user equipment 700 includes a sending unit 701, a receiving unit 702, and a control unit 703.

The sending unit 701 is configured to send an access capability indication or an access request to a base station controller of a serving base station of the user equipment 700, where the access capability indication is used to indicate that the user equipment 700 is capable of accessing a WLAN through an AP.

Optionally, the access capability indication and the access request may be carried in a radio resource control (RRC) connection establishment request message or an RRC connection establishment complete message. The RRC connection establishment request message is the first message sent by the user equipment to a mobile network, and the RRC connection establishment complete message is the first dedicated message sent by the user equipment to the mobile network. Using the RRC connection establishment request message or the RRC connection establishment complete message to bear the access capability indication and the access request helps the base station controller quickly perform WLAN access control according to the access request.

The receiving unit 702 is configured to receive information about a first AP set that is determined by the base station controller in a case where the base station controller receives the access capability indication or the access request, where the first AP set includes at least one AP.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

Optionally, the information about the first AP set may be carried in an RRC connection establishment message, an RRC connection release message or a measurement control message. In a case where the information about the first AP set is carried in the RRC connection release message, the base station controller releases an RRC connection to the user equipment.

The control unit 703 is configured to determine an access AP for accessing the WLAN from the at least one AP in the received first AP set.

Optionally, in a case where the first AP set includes only one AP, the control unit 703 determines that the access AP is the AP. The control unit 703 may further determine at least one of the following according to the information about the first AP set: signal strength of at least one AP in the first AP set, signal quality of at least one AP in the first AP set, and a path loss of at least one AP in the first AP set. The control unit 703 may select an AP with the highest signal quality or signal strength in the first AP set as the access AP, and may also select an AP with the lowest path loss in the first AP set as the access AP.

The control unit 703 may further be configured to determine a second AP set from the at least one AP in the received first AP set, where the second AP set includes at least one AP.

Optionally, the control unit 703 may further determine at least one of the following according to the information about the first AP set: signal strength of at least one AP in the first AP set, signal quality of at least one AP in the first AP set, and a path loss of at least one AP in the first AP set. The control unit 703 may determine an AP in the second AP set from the at least one AP in the first AP set according to a preset condition. For example, the control unit 703 may determine an AP whose signal quality or signal strength is higher than a specified threshold as an AP in the second AP set, and the control unit 703 may also determine, according to a specified proportion, an AP whose signal quality or signal strength ranks high as an AP in the second AP set. It should be noted that the preceding method is only an example, a method for determining an AP in the second AP set is not limited to the preceding method.

The sending unit 701 may further be configured to send information about the second AP set to the base station controller according to the second AP set.

Optionally, the information about the second AP set includes: first information and second information, where the first information includes at least one of the following: signal quality of the at least one AP in the second AP set, signal strength of the at least one AP in the second AP set, and a path loss of the at least one AP in the second AP set, and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

The receiving unit 702 may further be configured to receive information about a third AP set that is determined by the base station controller from the second AP set.

Optionally, the information about the third AP set includes at least one of the following: a channel number of at least one AP in the third AP set, identification information of at least one AP in the third AP set, information about a beacon channel of at least one AP in the third AP set, a security parameter of at least one AP in the third AP set, transmit signal strength of at least one AP in the third AP set, and transmit signal quality of at least one AP in the third AP set, where the information about the beacon channel of the at least one AP in the third AP set is a sending time point and period of the beacon channel of the at least one AP in the third. AP set, and the security parameter of the at least one AP in the third AP set includes a key used for access and/or an authentication type.

The control unit 703 may further be configured to determine an access AP for accessing the WLAN from the at least one AP in the third AP set.

Optionally, in a case where only one AP exists in the third AP set, the access AP is the AP. In a case where more than one AP exists in the third AP set, the control unit 703 may select an AP with the highest signal quality or signal strength in the third AP set as the access AP, and may also select an AP with the lowest path loss in the third AP set as the access AP. The signal strength, signal quality, or path loss of an AP in the third AP set may be determined by the control unit 703 according to the information about the third AP set.

It should be noted that the user equipment may determine the access AP directly from the first AP set, or the user equipment may also determine the access AP by using the second AP set and the third AP set. If the user equipment determines the access AP directly from the first AP set, the access AP can be determined quickly; if the user equipment determines the access AP by using the second AP set and the third AP set, an AP with higher signal quality and/or signal strength can be determined.

The sending unit 701 is further configured to send identification information of the access AP to the base station controller.

The receiving unit 702 is further configured to receive a fourth AP set notified by the base station controller.

Optionally, in a case where all APs in the fourth AP set belong to the first AP set or the third AP set, the receiving unit 702 may receive indication information sent by the base station controller to the user equipment 700, and the control unit 703 may determine information about the fourth AP set from the received information about the first AP set and/or the received information about the third AP set according to the indication information.

Optionally, in a case where the fourth AP set is the same as the first AP set or the third AP set, the receiving unit 702 may receive a notification of the base station controller, where the notification is used to indicate that the fourth AP set is identical with the first AP set or the third AP set. The user equipment 700 may determine a switching target or a candidate target set by using the first AP set or the third AP set.

Optionally, the receiving unit 702 may receive the information about the fourth AP set.

Optionally, the information about the fourth AP set includes at least one of the following: a channel number of at least one AP in the fourth AP set, identification information of at least one AP in the fourth AP set, information about a beacon channel of at least one AP in the fourth AP set, a security parameter of at least one AP in the fourth AP set, transmit signal strength of at least one AP in the fourth AP set, and transmit signal quality of at least one AP in the fourth AP set, where the information about the beacon channel of the at least one AP in the fourth AP set is a transmission time and period of the beacon channel of the at least one AP in the fourth AP set, the transmission time of the beacon channel is a relative time relative to a reference time of the mobile network, and the security parameter of the at least one AP in the fourth AP set includes a key used for access and/or an authentication type.

The receiving unit 702 is further configured to receive a first threshold or a first threshold and a second threshold sent by the base station controller.

The control unit 703 is further configured to determine a switching target after the receiving unit 702 receives the second threshold and in a case where measurement information of the measured access AP is lower than the second threshold. The control unit 703 determines, according to the second threshold, that the switching target may be an AP or the base station controller.

Specifically, after the user equipment accesses the access AP, the control unit 703 needs to detect signal quality and/or signal strength of the access AP all the time. If the measurement information (signal quality or signal strength) of the access AP is lower than the second threshold, the control unit 703 measures measurement information of the at least one AP in the fourth AP set.

In a case where at least one AP whose measurement information is not lower than the second threshold exists in the fourth AP set, the control unit 703 may determine an AP (for example, select an AP with the highest signal quality or signal strength) as the switching target from the at least one AP whose measurement information is not lower than the second threshold.

Optionally, the user equipment 700 may further perform an authentication procedure and/or an association procedure with the AP through the base station controller, so that the AP confirms the identity of the user equipment.

In a case where no AP whose measurement information is not lower than the second threshold exists in the fourth AP set, the control unit 703 determines that the switching target is the base station controller.

The control unit 703 is further configured to determine a candidate target set after the receiving unit 702 receives the second threshold and in a case where measurement information of the measured access AP is lower than the second threshold.

Specifically, after the user equipment accesses the access AP, the control unit 703 needs to detect signal quality and/or signal strength of the access AP all the time. If the measurement information (signal quality or signal strength) of the access AP is lower than the second threshold, the control unit 703 measures measurement information of the at least one AP in the fourth AP set. In a case where at least one AP whose measurement information is not lower than the second threshold exists in the fourth AP set, the control unit 703 may determine the candidate target set from the at least one AP whose measurement information is not lower than the second threshold. For example, the control unit 703 may determine an AP whose measurement information is higher than a specified threshold as an AP in the candidate target set, and the control unit 703 may also determine, according to a specified proportion, an AP whose measurement information ranks high as an AP in the candidate target set. It should be noted that the preceding method is only an example, a method for determining an AP in the candidate target set is not limited to the preceding method.

The control unit 703 may further be configured to determine a switching target from the at least one AP in the candidate target set.

Optionally, the user equipment 700 may further perform an authentication and/or an association procedure with the at least one AP in the candidate target set through the base station controller, so that the at least one AP in the candidate target set confirms the identity of the user equipment. The sending unit 701 may further be configured to send authentication information and/or association information to the at least one AP in the candidate target set through the base station controller. The control unit 703 may select one AP (for example, select an AP with the highest signal quality or signal strength) as the switching target from at least one AP on which association and authentication have been completed in the candidate target set.

The sending unit 701 may further be configured to notify the base station controller of the candidate target set.

Optionally, the sending unit 701 may send indication information to the base station controller, and the base station controller may determine information about the candidate target set from the determined fourth AP set according to the indication information. The sending unit 701 may also send the information about the candidate target set to the base station controller.

Optionally, the information about the candidate target set includes third information and fourth information, where the third information includes at least one of the following: signal quality of the at least one AP in the candidate target set, signal strength of the at least one AP in the candidate target set, and a path loss of the at least one AP in the candidate target set; and the fourth information includes at least one of the following: a channel number of at least one AP in the candidate target set, identification information of at least one AP in the candidate target set, and information about a beacon channel of at least one AP in the candidate target set, where the information about the beacon channel of the at least one AP in the candidate target set is a transmission time and period of the beacon channel of the at least one AP in the candidate target set, and the transmission time of the beacon channel is a relative time relative to a reference time of the mobile network.

Optionally, the user equipment 700 may further perform an authentication and/or an association procedure with the at least one AP in the candidate target set through the base station controller, so that the at least one AP in the candidate target set confirms the identity of the user equipment. Specifically, the sending unit 701 may send authentication information and/or association information to the at least one AP in the candidate target set through the base station controller. The base station controller may select one AP (for example, select an AP with the highest signal quality or signal strength) as the switching target from at least one AP on which association and authentication have been completed in the candidate target set.

The receiving unit 702 may further be configured to receive the switching target notified by base station controller.

Specifically, the receiving unit 702 may receive indication information sent by the base station controller to the user equipment, and the control unit 703 may determine information about the switching target from the determined candidate target set according to the indication information. The receiving unit 702 may receive the information about the switching target sent by the base station controller to the user equipment.

Optionally, the information about the candidate target set includes at least one of the following: a channel number of the switching target, identification information of the switching target, information about a beacon channel of the switching target, and a security parameter of the switching target, where the information about the beacon channel of the switching target is a transmission time and period of the beacon channel of the switching target, the transmission time of the beacon channel is a relative time relative to a reference time of the mobile network, and the security parameter of the switching target includes a key used for access and/or an authentication type.

The control unit 703 may further be configured to: in a case where the control unit 703 determines that the measurement information of the access AP is lower than the first threshold and the control unit 703 determines that the switching target is an AP, disconnect from the access AP, access the switching target, and perform data connection through the switching target to access the Internet. Further, the sending unit 701 may further be configured to send the identification information of the switching target to the radio network controller. The case in which the control unit 703 determines that the switching target is an AP includes the following: The control unit 703 may directly determine that the switching target is an AP, the control unit 703 may determine the switching target from the candidate target set, or the receiving unit 702 may also receive the switching target determined by the base station controller.

The control unit 703 may further be configured to: in a case where the control unit 703 determines that the measurement information of the access AP is lower than the first threshold and the user equipment needs to access the base station controller, disconnect from the access AP, access the base station controller, and perform data connection through the base station controller to access the Internet. The case in which the user equipment needs to access the base station controller includes the following: The receiving unit 702 receives only the first threshold, or the control unit 703 determines that the switching target is the base station controller according to the second threshold.

Specifically, after the user equipment 700 accesses the access AP, the control unit 703 needs to detect signal quality and/or signal strength of the access AP all the time. If the measurement information (signal quality or signal strength) of the access AP is lower than the first threshold, the sending unit 701 may further be configured to send a connection establishment request or a data transmission state message to the base station controller. Specifically, in a case where no connection exists between the user equipment and the base station controller, the sending unit 701 sends a connection establishment request to the base station controller, so that the user equipment reestablishes a connection with the base station controller; in a case where a connection to the base station controller is not released, the sending unit 701 sends a data transmission state message to the base station controller, so that the user equipment restores data transmission with the base station controller, where the data transmission state message includes a message such as a measurement report and a cell update request. Further, the connection establishment request or the data transmission state message of the base station may further include indication information used to indicate that the WLAN is unavailable. After the sending unit 701 sends the connection establishment request or the data state restoration indication to the base station controller, the control unit 703 may disconnect from the access AP, access the base station controller, and perform data connection with the base station controller to access the Internet.

Optionally, if the receiving unit 702 does not receive a first switching threshold configuration, or the control unit 703 determines that signal quality or signal strength of the access AP is not lower than the first switching threshold but the signal quality or the signal strength of the access AP is not sufficient to support data transmission of the user equipment 700, the sending unit 701 may also directly send a connection establishment request or a data transmission state message to the base station controller. Specifically, in a case where no connection exists between the user equipment and the base station controller, the sending unit 701 sends a connection establishment request to the base station controller, so that the user equipment reestablishes a connection with the base station controller, in a case where a connection to the base station controller is not released, the sending unit 701 sends a data transmission state message to the base station controller, so that the user equipment restores data transmission with the base station controller, where the data transmission state message includes a message such as a measurement report and a cell update request. Further, the connection establishment request or the data transmission state message of the base station may further include indication information used to indicate that the WLAN is unavailable. After the sending unit 701 sends the connection establishment request or the data state restoration indication to the base station controller, the control unit 703 may disconnect from the access AP, access the base station controller, and perform data connection with the base station controller to access the Internet.

Optionally, identification information of an AP, an access AP, or a switching target in the set is a unique identifier corresponding to the AP, for example, a BSSID, an SSD, an ESSID, or a MAC address.

According to the user equipment 700, when the user equipment needs to access a WLAN through an AP to access the Internet, a base station controller may notify the user equipment of an available AP. In this way, the user equipment can access the WLAN directly through the available AP and does not need to request a password from an operator and enter the password during access.

According to the user equipment 700, the base station controller may notify the user equipment of an AP to which the user equipment can be switched, so as to assist the user equipment in accessing the AP to which the user equipment can be switched or the base station controller in the case of relatively poor signal quality or signal strength of an access AP. The user equipment can directly access the AP to which the user equipment can be switched or the base station controller, and does not need to request, from an operator, a password of the AP to which the user equipment can be switched and enter the password during the access. In this way, a switching procedure is smoother.

Another embodiment of the present application provides a base station controller. The base station controller is a base station controller of a serving base station of a user equipment and can perform the steps performed by the base station controller in the preceding methods. The base station controller includes a receiver, a processor, and a transmitter.

The receiver is configured to receive an access capability indication or access request sent by the user equipment, where the access capability indication is used to indicate that the user equipment is capable of accessing a WLAN through an AP.

Optionally, the access capability indication and the access request may be carried in a radio resource control (RRC) connection establishment request message or an RRC connection establishment complete message. The RRC connection establishment request message is the first message sent by the user equipment to a mobile network, and the RRC connection establishment complete message is the first dedicated message sent by the user equipment to the mobile network. Using the RRC connection establishment request message or the RRC connection establishment complete message to bear the access capability indication and the access request helps the base station controller quickly perform WLAN access control according to the access request.

The processor is configured to determine a first AP set in a case where the receiver receives the access capability indication or the access request, where the first AP set includes at least one AP.

The transmitter is configured to send information about the first AP set to the user equipment according to the first AP set determined by a control unit.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal strength of at least one AP in the first AP set, and transmit signal quality of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type. Optionally, the information about the first AP set may be carried in an RRC connection establishment message, an RRC connection release message or a measurement control message. In a case where the information about the first AP set is carried in the RRC connection release message, the base station controller releases an RRC connection to the user equipment.

The receiver is further configured to receive information about a second AP set sent by the user equipment.

Optionally, the information about the second AP set includes: first information and second information, where the first information includes at least one of the following: signal quality of at least one AP in the second AP set, signal strength of at least one AP in the second AP set, and a path loss of at least one AP in the second AP set, and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

The processor is further configured to determine a third AP set from the second AP set, where the third AP set includes at least one AP.

Optionally, the processor may determine the third AP set from the at least one AP in the second AP set according to a preset condition. For example, the processor may determine an AP whose signal quality or signal strength is higher than a specified threshold as an AP in the third AP set, the processor may also determine, according to a specified proportion, an AP whose signal quality or signal strength ranks high as an AP in the third AP set, and the processor may also determine an AP in the third AP set according to other information (for example, load and a congestion degree of a backhaul) about the at least one AP in the second AP set. It should be noted that the preceding method is only an example, a method for determining an AP in the third AP set is not limited to the preceding method.

The transmitter is further configured to send information about the third AP set determined by the processor to the user equipment.

Optionally, the information about the third AP set includes at least one of the following: a channel number of at least one AP in the third AP set, identification information of the at least one AP in the third AP set, information about a beacon channel of at least one AP in the third AP set, a security parameter of at least one AP in the third AP set, transmit signal strength of at least one AP in the third AP set, and transmit signal quality of at least one AP in the third AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

The receiver is further configured to receive identification information of the access AP sent by the user equipment or the access AP.

Optionally, the access AP may be determined by the user equipment from the first AP set, and the access AP may also be determined by the user equipment from the third AP set. If the user equipment determines the access AP from the first AP set, the access AP can be determined quickly; if the user equipment determines the access AP from the third AP set, an AP with higher signal quality and/or signal strength can be determined.

The processor is further configured to determine a fourth AP set according to location information of the user equipment after the receiver receives the identification information of the access AP, where the fourth AP set includes at least one AP.

Specifically, the processor may determine at least one AP whose coverage includes a location in which the user equipment is located as an AP in the fourth AP set, and may also determine at least one AP whose coverage is adjacent to a search scope in which the user equipment is capable of performing AP search as an AP in the fourth AP set.

Optionally, all APs in the fourth AP set may belong to the first AP set or the third. AP set, or the at least one AP in the fourth AP set may not belong to the first AP set or the third AP set.

The transmitter is further configured to notify the user equipment of the fourth AP set. The user equipment may determine a switching target or a candidate target set by using the fourth AP set.

Optionally, in a case where all APs in the fourth AP set belong to the first AP set or the third AP set, the transmitter may send only indication information to the user equipment, and the user equipment may determine information about the fourth AP set from the received information about the first AP set and/or the received information about the third AP set according to the indication information.

Optionally, in a case where the fourth AP set is the same as the first AP set or the third AP set, the transmitter may notify the user equipment that the fourth AP set is identical with the first AP set or the third AP set. The user equipment may determine a switching target or a candidate target set by using the first AP set or the third AP set.

Optionally, the base station controller may further send the information about the fourth AP set to the user equipment.

Optionally, the information about the fourth AP set includes at least one of the following: a channel number of at least one AP in the fourth AP set, identification information of at least one AP in the fourth AP set, information about a beacon channel of at least one AP in the fourth AP set, a security parameter of at least one AP in the fourth AP set, transmit signal strength of at least one AP in the fourth AP set, and transmit signal quality of at least one AP in the fourth AP set, where the information about the beacon channel of the at least one AP in the fourth AP set is a transmission time and period of the beacon channel of the at least one AP in the fourth AP set, the transmission time of the beacon channel is a relative time relative to a reference time of the mobile network, and the security parameter of the at least one AP in the fourth AP set includes a key used for access and/or an authentication type.

The transmitter is further configured to send a first threshold or a first threshold and a second threshold to the user equipment.

Optionally, the transmitter may send the first threshold or the first threshold and the second threshold together with the information about the first AP set or the information about the third AP set, or before or after sending the information about the first AP set or the information about the third AP set. The transmitter may also send the first threshold or the first threshold and the second threshold at the time of notifying the fourth AP set, and may also send the first threshold or the first threshold and the second threshold before or after notifying the fourth AP set.

Optionally, the first threshold and/or the second threshold may be signal quality or signal strength. The measurement information corresponds to the first threshold and/or the second threshold and may be signal quality or signal strength.

The receiver is further configured to receive the candidate target set notified by the user equipment.

Specifically, the receiver may receive indication information sent by the user equipment, and the processor may determine information about the candidate target set from the determined fourth AP set according to the indication information. The receiver may further receive the information about the candidate target set sent by the user equipment.

Optionally, the information about the candidate target set includes third information and fourth information, where the third information includes at least one of the following: signal quality of at least one AP in the candidate target set, signal strength of at least one AP in the candidate target set, and a path loss of at least one AP in the candidate target set; and the fourth information includes at least one of the following: a channel number of at least one AP in the candidate target set, identification information of at least or AP in the candidate target set, and information about a beacon channel of at least one AP in the candidate target set, where the information about the beacon channel of the at least one AP in the candidate target set is a transmission time and period of the beacon channel of the at least one AP in the candidate target set, and the transmission time of the beacon channel is a relative time relative to a reference time of the mobile network.

The processor is further configured to determine a switching target from the at least one AP in the candidate target set.

Optionally, the processor may determine the switching target according to the information about the candidate target set and/or other information (for example, load and a congestion degree of a backhaul) about the at least one AP in the candidate target set. For example, the processor may select an AP with the highest signal quality or signal strength as the switching target.

The receiver is further configured to receive authentication information and/or association information sent by the user equipment, and the transmitter is further configured to forward the authentication information and/or the association information to the at least one AP in the candidate target set. The processor is further configured to select one AP (for example, select an AP with the highest signal quality or signal strength) as the switching target from an AP on which association and/or authentication has been completed.

The transmitter is further configured to notify the switching target determined by the processor to the user equipment.

Specifically, the transmitter may send indication information to the user equipment, and the user equipment may determine information about the switching target from the determined candidate target set according to the indication information. The transmitter may also send the information about the switching target to the user equipment.

Optionally, the information about the switching target includes at least one of the following: a channel number of the switching target, identification information of the switching target, information about a beacon channel of the switching target, and a security parameter of the switching target, where the information about the beacon channel of the switching target is a transmission time and period of the beacon channel of the switching target, the transmission time of the beacon channel is a relative time relative to a reference time of the mobile network, and the security parameter of the switching target includes a key used for access and/or an authentication type.

The receiver is further configured to: in a case where the switching target is an AP and the AP is determined by the user equipment, receive identification information of the switching target sent by the user equipment and/or the switching target.

The receiver is further configured to receive a connection establishment request or a data transmission state message sent by the user equipment.

The processor is further configured to reestablish a connection with the user equipment in a case where the receiver receives the connection establishment request. Alternatively, the processor is further configured to restore a connection with the user equipment in a case where the receiver receives the data transmission state message.

Optionally, the data transmission state message includes a message such as a measurement report and a cell update request. Further, the connection establishment request or the data transmission state message may further include indication information used to indicate that the WLAN is unavailable.

Optionally, identification information of an AP, an access AP, or a switching target in the set is a unique identifier corresponding to the AP, for example, a BSSID, an SSM, an ESSID, or a MAC address.

According to the base station controller, when a user equipment needs to access a WLAN through an AP to access the Internet, the base station controller may notify the user equipment of an available AP. In this way, the user equipment can access the WLAN directly through the available AP and does not need to request a password from an operator and enter the password during access.

According to the base station controller, the base station controller may notify the user equipment of an AP to which the user equipment can be switched, so as to assist the user equipment in accessing the AP to which the user equipment can be switched or the base station controller in the case of relatively poor signal quality or signal strength of an access AP. The user equipment can directly access the AP to which the user equipment can be switched or the base station controller, and does not need to request, from an operator, a password of the AP to which the user equipment can be switched and enter the password during the access. In this way, a switching procedure is smoother.

Another embodiment of the present application provides a user equipment. The user equipment can perform the steps performed by the user equipment in the preceding methods. The user equipment includes a transmitter, a receiver, and a processor.

The transmitter is configured to send an access capability indication or an access request to a base station controller of a serving base station of the user equipment 700, where the access capability indication is used to indicate that the user equipment is capable of accessing a WLAN through an AP.

Optionally, the access capability indication and the access request may be carried in a radio resource control (RRC) connection establishment request message or an RRC connection establishment complete message. The RRC connection establishment request message is the first message sent by the user equipment to a mobile network, and the RRC connection establishment complete message is the first dedicated message sent by the user equipment to the mobile network. Using the RRC connection establishment request message or the RRC connection establishment complete message to bear the access capability indication and the access request helps the base station controller quickly perform WLAN access control according to the access request.

The receiver is configured to receive information about a first AP set that is determined by the base station controller in a case where the base station controller receives the access capability indication or the access request, where the first AP set includes at least one AP.

Optionally, the information about the first AP set includes at least one of the following: a channel number of at least one AP in the first AP set, identification information of at least one AP in the first AP set, information about a beacon channel of at least one AP in the first AP set, a security parameter of at least one AP in the first AP set, transmit signal quality of at least one AP in the first AP set, and transmit signal strength of at least one AP in the first AP set, where the information about the beacon channel of the at least one AP in the first AP set is a sending time point and period of the beacon channel of the at least one AP in the first AP set, and the security parameter of the at least one AP in the first AP set includes a key used for access and/or an authentication type.

Optionally, the information about the first AP set may be carried in an RRC connection establishment message, an RRC connection release message or a measurement control message. In a case where the information about the first AP set is carried in the RRC connection release message, the base station controller releases an RRC connection to the user equipment.

The processor is configured to determine an access AP for accessing the WLAN from the at least one AP in the received first AP set.

Optionally, in a case where the first AP set includes only one AP, the processor determines that the access AP is the AP. The processor may further determine at least one of the following according to the information about the first AP set: signal strength of at least one AP in the first AP set, signal quality of at least one AP in the first AP set, and a path loss of at least one AP in the first AP set. The processor may select an AP with the highest signal quality or signal strength in the first AP set as the access AP, and may also select an AP with the lowest path loss in the first AP set as the access AP.

The processor may further be configured to determine a second AP set from the at least one AP in the received first AP set, where the second AP set includes at least one AP.

Optionally, the processor may further determine at least one of the following according to the information about the first AP set: signal strength of the at least one AP in the first AP set, signal quality of the at least one AP in the first AP set, and a path loss of the at least one AP in the first AP set. The processor may determine an AP in the second AP set from the at least one AP in the first AP set according to a preset condition. For example, the processor may determine an AP whose signal quality or signal strength is higher than a specified threshold as an AP in the second AP set, and the processor may also determine, according to a specified proportion, an AP whose signal quality or signal strength ranks high as an AP in the second AP set. It should be noted that the preceding method is only an example, a method for determining an AP in the second AP set is not limited to the preceding method.

The transmitter may further be configured to send information about the second AP set to the base station controller according to the second AP set.

Optionally, the information about the second AP set includes: first information and second information, where the first information includes at least one of the following: signal quality of at least one AP in the second AP set, signal strength of at least one AP in the second AP set, and a path loss of at least one AP in the second AP set, and the second information includes at least one of the following: a channel number of at least one AP in the second AP set, identification information of at least one AP in the second AP set, and information about a beacon channel of at least one AP in the second AP set, where the information about the beacon channel of the at least one AP in the second AP set is a sending time point and period of the beacon channel of the at least one AP in the second AP set.

The receiver may further be configured to receive information about a third AP set that is determined by the base station controller from the second AP set.

Optionally, the information about the third AP set includes at least one of the following: a channel number of at least one AP in the third AP set, identification information of at least one AP in the third AP set, information about a beacon channel of at least one AP in the third AP set, a security parameter of at least one AP in the third AP set, transmit signal strength of at least one AP in the third AP set, and transmit signal quality of at least one AP in the third AP set, where the information about the beacon channel of the at least one AP in the third AP set is a sending time point and period of the beacon channel of the at least one AP in the third AP set, and the security parameter of the at least one AP in the third AP set includes a key used for access and/or an authentication type.

The processor may further be configured to determine an access AP for accessing the WLAN from the at least one AP in the third AP set.

Optionally, in a case where only one AP exists in the third AP set, the access AP is the AP. In a case where more than one AP exists in the third AP set, the processor may select an AP with the highest signal quality or signal strength in the third AP set as the access AP, and may also select an AP with the lowest path loss in the third AP set as the access AP. The signal strength, signal quality, or path loss of an AP in the third AP set may be determined by the processor according to the information about the third AP set.

It should be noted that the user equipment may determine the access AP directly from the first AP set, or the user equipment may also determine the access AP by using the second AP set and the third AP set. If the user equipment determines the access AP directly from the first AP set, the access AP can be determined quickly; if the user equipment determines the access AP by using the second AP set and the third AP set, an AP with higher signal quality and/or signal strength can be determined.

The transmitter is further configured to send identification information of the access AP to the base station controller.

The receiver is further configured to receive a fourth AP set notified by the base station controller.

Optionally, in a case where all APs in the fourth AP set belong to the first AP set or the third AP set, the receiver may receive indication information sent by the base station controller to the user equipment, and the processor may determine information about the fourth AP set from the received information about the first AP set and/or the received information about the third AP set according to the indication information.

Optionally, in a case where the fourth AP set is the same as the first AP set or the third AP set, the receiver may receive a notification of the base station controller, where the notification is used to indicate that the fourth AP set is identical with the first AP set or the third AP set. The user equipment may determine a switching target or a candidate target set by using the first AP set or the third AP set.

Optionally, the receiver may receive the information about the fourth AP set.

Optionally, the information about the fourth AP set includes at least one of the following: a channel number of at least one AP in the fourth AP set, identification information of at least one AP in the fourth AP set, information about a beacon channel of at least one AP in the fourth AP set, a security parameter of at least one AP in the fourth AP set, transmit signal strength of at least one AP in the fourth AP set, and transmit signal quality of at least one AP in the fourth AP set, where the information about the beacon channel of the at least one AP in the fourth AP set is a transmission time and period of the beacon channel of the at least one AP in the fourth AP set, the transmission time of the beacon channel is a relative time relative to a reference time of the mobile network, and the security parameter of the at least one AP in the fourth AP set includes a key used for access and/or an authentication type.

The receiver is further configured to receive a first threshold or a first threshold and a second threshold sent by the base station controller.

The processor is further configured to determine a switching target after the receiver receives the second threshold and in a case where measurement information of the measured access AP is lower than the second threshold. The processor determines, according to the second threshold, that the switching target may be an AP or the base station controller.

Specifically, after the user equipment accesses the access AP, the processor needs to detect signal quality and/or signal strength of the access AP all time. If the measurement information (signal quality or signal strength) of the access AP is lower than the second threshold, the processor measures measurement information of the at least one AP in the fourth AP set.

In a case where at least one AP whose measurement information is not lower than the second threshold exists in the fourth AP set, the processor may determine an AP (for example, select an AP with the highest signal quality or signal strength) as the switching target from the at least one AP whose measurement information is not lower than the second threshold.

Optionally, the user equipment may further perform an authentication procedure and/or an association procedure with the AP through the base station controller, so that the AP confirms the identity of the user equipment.

In a case where no AP whose measurement information is not lower than the second threshold exists in the fourth AP set, the processor determines that the switching target is the base station controller.

The processor is further configured to determine a candidate target set after the receiver receives the second threshold and in a case where measurement information of the measured access AP is lower than the second threshold.

Specifically, after the user equipment accesses the access AP, the processor needs to detect signal quality and/or signal strength of the access AP all the time. If the measurement information (signal quality or signal strength) of the access AP is lower than the second threshold, the processor measures measurement information of the at least one AP in the fourth AP set. In a case where at least one AP whose measurement information is not lower than the second threshold exists in the fourth AP set, the processor may determine the candidate target set from the at least one AP whose measurement information is not lower than the second threshold. For example, the processor may determine an AP whose measurement information is higher than a specified threshold as an AP in the candidate target set, and the processor may also determine, according to a specified proportion, an AP whose measurement information ranks high as an AP in the candidate target set. It should be noted that the preceding method is only an example, a method for determining an AP in the candidate target set is not limited to the preceding method.

The processor is further configured to determine a switching target from the at least one AP in the candidate target set.

Optionally, the user equipment may further perform an authentication and/or an association procedure with the at least one AP in the candidate target set through the base station controller, so that the at least one AP in the candidate target set confirms the identity of the user equipment. The transmitter may further be configured to send authentication information and/or association information to the at least one AP in the candidate target set through the base station controller. The processor may select one AP (for example, select an AP with the highest signal quality or signal strength) as the switching target from at least one AP on which association and authentication have been completed in the candidate target set.

The transmitter may further be configured to notify the base station controller of the candidate target set.

Optionally, the transmitter may send indication information to the base station controller, and the base station controller may determine information about the candidate target set from the determined fourth AP set according to the indication information. The transmitter may also send the information about the candidate target set to the base station controller.

Optionally, the information about the candidate target set includes third information and fourth information, where the third information includes at least one of the following: signal quality of at least one AP in the candidate target set, signal strength of at least one AP in the candidate target set, and a path loss of at least one AP in the candidate target set; and the fourth information includes at least one of the following: a channel number of at least one AP in the candidate target set, identification information of at least one AP in the candidate target set, and information about a beacon channel of at least one AP in the candidate target set, where the information about the beacon channel of the at least one AP in the candidate target set is a transmission time and period of the beacon channel of the at least one AP in the candidate target set, and the transmission time of the beacon channel is a relative time relative to a reference time of the mobile network.

Optionally, the user equipment may further perform an authentication and/or an association procedure with the at least one AP in the candidate target set through the base station controller, so that the at least one AP in the candidate target set confirms the identity of the user equipment. Specifically, the transmitter may send authentication information and/or association information to the at least one AP in the candidate target set through the base station controller. The base station controller may select one AP (for example, select an AP with the highest signal quality or signal strength) as the switching target from at least one AP on which association and authentication have been completed in the candidate target set.

The receiver may further be configured to receive a switching target notified by the base station controller.

Specifically, the receiver may receive indication information sent by the base station controller to the user equipment, and the processor may determine information about the switching target from the determined candidate target set according to the indication information. The receiver may receive the information about the switching target sent by the base station controller to the user equipment.

Optionally, the information about the candidate target set includes at least one of the following: a channel number f the switching target, identification information of the switching target, information about a beacon channel of the switching target, and a security parameter of the switching target, where the information about the beacon channel of the switching target is a transmission time and period of the beacon channel of the switching target, the transmission time of the beacon channel is a relative time relative to a reference time of the mobile network, and the security parameter of the switching target includes a key used for access and/or an authentication type.

The processor may further be configured to: in a case where the processor determines that the measurement information of the access AP is lower than the first threshold and the processor determines that the switching target is an AP, disconnect from the access AP, access the switching target, and perform data connection through the switching target to access the Internet. Further, the transmitter may further be configured to send the identification information of the switching target to the radio network controller. The case in which the processor determines that the switching target is an AP includes the following: The processor may directly determine that the switching target is an AP, the processor may determine the switching target from the candidate target set, or the processor may also receive the switching target determined by the base station controller.

The processor may further be configured to: in a case where the processor determines that the measurement information of the access AP is lower than the first threshold and the user equipment needs to access the base station controller, disconnect from the access AP, access the base station controller, and perform data connection through the base station controller to access the Internet. The case in which the user equipment needs to access the base station controller includes the following: The receiver receives only the first threshold, or the processor determines that the switching target is the base station controller according to the second threshold.

Specifically, after the user equipment accesses the access AP, the processor needs to detect signal quality and/or signal strength of the access AP all the time. If the measurement information (signal quality or signal strength) of the access AP is lower than the first threshold, the transmitter may further be configured to send a connection establishment request or a data transmission state message to the base station controller. Specifically, in a case where no connection exists between the user equipment and the base station controller, the transmitter sends a connection establishment request to the base station controller, so that the user equipment reestablishes a connection with the base station controller; in a case where a connection to the base station controller is not released, the transmitter sends a data transmission state message to the base station controller, so that the user equipment restores data transmission with the base station controller, where the data transmission state message includes a message such as a measurement report and a cell update request. Further, the connection establishment request or the data transmission state message of the base station may further include indication information used to indicate that the WLAN is unavailable. After the transmitter sends the connection establishment request or the data state restoration indication to the base station controller, the processor may disconnect from the access AP, access the base station controller, and perform data connection with the base station controller to access the Internet.

Optionally, if the receiver does not receive a first switching threshold configuration, or the processor determines that signal quality or signal strength of the access AP is not lower than the first switching threshold but the signal quality or the signal strength of the access AP is not sufficient to support data transmission of the user equipment, the transmitter may also directly send a connection establishment request or a data transmission state message to the base station controller. Specifically, in a case where no connection exists between the user equipment and the base station controller, the transmitter sends a connection establishment request to the base station controller, so that the user equipment reestablishes a connection with the base station controller; in a case where a connection to the base station controller is not released, the transmitter sends a data transmission state message to the base station controller, so that the user equipment restores data transmission with the base station controller, where the data transmission state message includes a message such as a measurement report and a cell update request. Further, the connection establishment request or the data transmission state message of the base station may further include indication information used to indicate that the WLAN is unavailable. After the transmitter sends the connection establishment request or the data state restoration indication to the base station controller, the processor may disconnect from the access AP, access the base station controller, and perform data connection with the base station controller to access the Internet.

Optionally, identification information of an AP, an access AP, or a switching target in the set is a unique identifier corresponding to the AP, for example, a BSSID, an SSID, an ESSID, or a MAC address.

According to the user equipment, when the user equipment needs to access a WLAN through an AP to access the Internet, a base station controller may notify the user equipment of an available AP. In this way, the user equipment can access the WLAN directly through the available AP and does not need to request a password from an operator and enter the password during access.

According to the user equipment, the base station controller may notify the user equipment of an AP to which the user equipment can be switched, so as to assist the user equipment in accessing the AP to which the user equipment can be switched or the base station controller in the case of relatively poor signal quality or signal strength of an access AP. The user equipment can directly access the AP to which the user equipment can be switched or the base station controller, and does not need to request, from an operator, a password of the AP to which the user equipment can be switched and enter the password during the access. In this way, a switching procedure is smoother.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may implement the described functions for each particular application by using different methods, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to the corresponding process in the foregoing method embodiments, and the details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present application essentially, or the part contributing to the prior art, or all or a part of the technical solutions may be implemented in a form of a software product. The computer software product is stored in a storage medium, and includes several instructions for instructing a computer device (which may be a personal computer, a server, or a network device) or a processor (processor) to perform all or a part of the steps of the methods described in the embodiments of the present application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application is subject: to the appended claims.

What is claimed is:

1. A system comprising:
   a base station in a radio access network (RAN), the base station configured to:
      determine an access point (AP) set comprising at least one AP of a wireless local area network (WLAN), and
      send information about the AP set and a threshold for use by user equipment (UE) accessing the RAN when the UE is in the WLAN; and
   the UE configured to:
      receive the threshold and the information about the AP set from the base station,
      access an access AP of the AP set according to the information about the AP set, and
      access the base station after accessing the access AP when measurement of signal quality or signal strength information of the access AP is lower than the threshold.

2. The system according to claim 1, wherein the information about the AP set comprises identification information of at least one AP in the AP set.

3. The system according to claim 2, wherein the identification information of at least one AP in the AP set comprises at least one of: a basic service set identifier (BSSID), a service set identifier (SSID), an extended service set identifier (ESSID), or a media access control (MAC) address.

4. The system according to claim 1, wherein the threshold comprises at least one of signal quality and signal strength.

5. The system according to claim 1, wherein when accessing the base station, the UE is further configured to:
   disconnect from the access AP in response to the measurement of signal quality or signal strength of the access AP being lower than the threshold, and
   access the base station.

6. The system according to claim 1, wherein when accessing the base station, the UE is further configured to:
   send a connection establishment request when no connection to the base station exists, wherein the connection establishment request is used by the UE to reestablish a connection with the base station.

7. The system according to claim 1, wherein when accessing the base station, the UE is further configured to:
   send a data transmission state message to the base station, wherein the data transmission state message is used to restore a state of data transmission with the base station.

8. A communication method comprising:
- determining, by a base station in a radio access network (RAN), an access point (AP) set comprising at least one AP of a wireless local area network (WLAN);
- sending, by the base station, information about the AP set and a threshold used for user equipment (UE) accessing the RAN when the UE is in the WLAN;
- receiving, by the UE, the threshold and the information about the AP set from the base station;
- accessing, by the UE, an access AP of the AP set according to the information about the AP set; and
- accessing, by the UE, the base station after accessing the access AP, when measurement of signal quality or signal strength of the access AP is lower than the threshold.

9. The communication method according to claim 8, wherein the information about the AP set comprises identification information of at least one AP in the AP set.

10. The communication method according to claim 9, wherein the identification information of at least one AP in the AP set comprises at least one of a basic service set identifier (BSSID), a service set identifier (SSID), an extended service set identifier (ESSID), or a media access control (MAC) address.

11. The communication method according to claim 8, wherein the threshold comprises at least one of signal quality and signal strength.

12. The communication method according to claim 8, wherein the accessing the base station comprises:
- disconnecting, by the UE, from the access AP in response to the measurement of signal quality or signal strength of the access AP being lower than the threshold; and
- accessing the base station.

13. The communication method according to claim 8, wherein the accessing the base station comprises:
- sending, by the UE, a connection establishment request when no connection to the base station exists, wherein the connection establishment request is used to reestablish a connection with the base station.

14. An apparatus comprising:
- a processor;
- a receiver configured to cooperate with the processor to receive a threshold and information about an access point (AP) set from a base station in a radio access network (RAN), wherein the AP set comprises at least one AP of a wireless local area network (WLAN), and the threshold for use by the apparatus in the WLAN accessing the RAN; and
- the processor configured to access an access AP of the AP set according to the information about the AP set received by the receiver; and to access the base station after accessing the access AP when measurement information of signal quality or signal strength information of the access AP is lower than the threshold.

15. The apparatus according to claim 14, wherein the information about the AP set comprises identification information of at least one AP in the AP set.

16. The apparatus according to claim 15, wherein the identification information of at least one AP in the AP set comprises at least one of: a basic service set identifier (BSSID), a service set identifier (SSID), an extended service set identifier (ESSID), or a media access control (MAC) address.

17. The apparatus according to claim 14, wherein the threshold comprises at least one of signal quality and signal strength.

18. The apparatus according to claim 14, wherein when accessing the base station, the processor is further configured to:
- disconnect from the access AP in response to the measurement information of signal quality or signal strength of the access AP being lower than the threshold; and
- access the base station.

19. The apparatus according to claim 14, wherein when accessing the base station, the processor is further configured to send a connection establishment request when no connection to the base station exists, wherein the connection establishment request is used by the UE to reestablish a connection with the base station.

20. The apparatus according to claim 14, wherein when accessing the base station, the processor is further configured to send a data transmission state message to the base station, wherein the data transmission state message is used to restore a state of data transmission with the base station.

* * * * *